US010809077B2

(12) United States Patent
Gordon et al.

(10) Patent No.: US 10,809,077 B2
(45) Date of Patent: Oct. 20, 2020

(54) NAVIGATING TO A MOVING TARGET

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Jonathan Lechner, North Salem, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 222 days.

(21) Appl. No.: 15/866,712

(22) Filed: Jan. 10, 2018

(65) Prior Publication Data

US 2019/0212155 A1   Jul. 11, 2019

(51) Int. Cl.
*G01C 21/34* (2006.01)
*G01S 5/02* (2010.01)
*G01C 21/20* (2006.01)
*H04W 4/024* (2018.01)
*H04W 4/029* (2018.01)
*G01S 19/42* (2010.01)

(52) U.S. Cl.
CPC ......... *G01C 21/3415* (2013.01); *G01C 21/20* (2013.01); *G01C 21/343* (2013.01); *G01S 5/0294* (2013.01); *G01S 19/42* (2013.01); *H04W 4/024* (2018.02); *H04W 4/029* (2018.02)

(58) Field of Classification Search
CPC .. G01C 21/3415; G01C 21/20; G01C 21/343; H04W 4/024; H04W 4/029; G01S 5/0294; G01S 19/42

USPC ........................................................ 701/467
See application file for complete search history.

(56) References Cited

U.S. PATENT DOCUMENTS

| 7,359,724 B2 | 4/2008 | Torvinen |
| 7,877,205 B2 | 1/2011 | Jang et al. |
| 8,275,361 B2 | 9/2012 | De Vries et al. |
| 8,463,537 B2 | 6/2013 | Mueller et al. |
| 8,825,377 B2 | 9/2014 | Callaghan et al. |

(Continued)

FOREIGN PATENT DOCUMENTS

| CN | 1381779 A | 11/2002 |
| WO | 2010086680 A1 | 8/2010 |

OTHER PUBLICATIONS

"List of IBM Patents or Patent Applications Treated as Related", dated Jan. 17, 2018, 2 pages.

(Continued)

*Primary Examiner* — Paula L Schneider
(74) *Attorney, Agent, or Firm* — Feb Cabrasawan; Amy J. Pattillo

(57) ABSTRACT

A moving target service receives path of locations of a moving target monitored by a navigation device. The moving target service calculates at least one optimized course for at least one user to follow to intersect with the moving target at one or more future locations predicted based on the path of the locations and based on at least one context record. The moving target service outputs the at least one optimized course to a display interface accessible to the at least one user for directing the user to navigate from a starting point to at least one of the one or more future locations.

22 Claims, 15 Drawing Sheets

(56) References Cited

U.S. PATENT DOCUMENTS

| | | | |
|---|---|---|---|
| 9,171,445 B2* | 10/2015 | Nishihara | H04W 4/70 |
| 9,179,262 B2 | 11/2015 | Ooka | |
| 10,482,900 B2* | 11/2019 | Mital | G06N 5/045 |
| 10,484,828 B2* | 11/2019 | Breuer | G01S 19/48 |
| 10,606,814 B2 | 3/2020 | Mital et al. | |
| 2008/0114528 A1 | 5/2008 | Seacat et al. | |
| 2011/0238755 A1 | 9/2011 | Khan et al. | |
| 2012/0239584 A1 | 9/2012 | Yariv et al. | |
| 2014/0114564 A1 | 4/2014 | Callaghan et al. | |
| 2015/0219458 A1 | 8/2015 | Shah et al. | |
| 2019/0212158 A1 | 7/2019 | Gordon et al. | |

OTHER PUBLICATIONS

U.S. Appl. No. 15/866,785, filed Jan. 10, 2018, In re Mealey, 82 pages.
"International Journal of Latest Technology in Engineering, Management, and Applied Science", accessed online from <http://www.ijltemas.in/digital-library/volume-iv-issue-ii.html> as of <Jan. 9, 2018>, 10 pages.
Zachariah et al., "A Survey on Optimal Path Finding Algorithms for Pursuing a Moving Target", International Journal of Latest Technology in Engineering, Management & Applied Science, IV(2): 122-124, 2015, accessed online at <http://www.ijltemas.in/DigitalLibrary/Vol.4Issue2/122-124.pdf>, 3 pages.
Botea et al., "Moving Target Search with Compressed Path Databases", Association for the Advancement of Artificial Intelligence, 2013, accessed online at <http://www.cs.toronto.edu/%7Ejabaier/publications/BoteaBHH13.pdf>, 5 pages.
Triharminto et al, "UAV Dynamic Path Planning for Intercepting of a Moving Target: A Review", Springer-Verlag Berlin Heidelberg, 2013, accessed online at <https://rd.springer.com/chapter/10.1007/978-3-642-40409-2_18>, 11 pages.
Kolling et al., "Computing and Executing Strategies for Moving Target Search", 2011, IEEE Int. Conf. on Robotics and Automation (ICRA), 4246-4253, accessed online at <http://liu.diva-portal.org/smash/get/diva2:459931/FULLTEXT02.pdf>, 10 pages.
Non-final Office Action, dated Apr. 29, 2020, U.S. Appl. No. 15/866,785, filed Jan. 10, 2018, in re Gordon, 25 pages.
Yagimli et al, "A GPS-based system design for the recognition and tracking of moving targets" 2009 4th International Conference on Recent Advances in Space Technologies, INSPEC, 2009, 8 pages.
Notice of Allowance, dated Jul. 31, 2020, U.S. Appl. No. 15/866,785, filed Jan. 10, 2018, In re Gordon, 20 pages.

* cited by examiner

NAVIGATING TO A MOVING TARGET

BACKGROUND

1. Technical Field

One or more embodiments of the invention relate generally to data processing and particularly to navigating to a moving target.

2. Description of the Related Art

Many portable electronic devices carried by users today include GPS systems. Navigation applications running on portable electronic devices provide services for routing a user from a current location, as detected by the GPS system, to a static address or static mapping coordinates entered by a user.

BRIEF SUMMARY

In one embodiment, a method is directed to a computer system receiving a selection by at least one user of at least one user path device to intersect with a moving target, wherein the moving target is identified by a particular entity identifier that is not a fixed address. The method is directed to the computer system detecting broadcasts of one or more monitored locations within a network environment, each identified by a separate entity identifier of a plurality of entity identifiers. The method is directed to the computer system reading a plurality of locations from broadcasts of the one or more monitored locations by a navigation device, the navigation device carried by the moving target identified by the particular entity identifier and using a location detecting system to determine and track a current location, a current time, and a direction of movement of the navigation device, the navigation device broadcasting the current location, the current time, and the direction of movement. The method is directed to the computer system accessing a path of the plurality of locations of the moving target monitored by the navigation device. The method is directed to the computer system predicting, based on the path of the plurality of locations and based on at least one context record, one or more future locations of the moving target. The method is directed to the computer system calculating at least one optimized course for the at least one user to follow to intersect with the moving target at the one or more future locations. The method is directed to the computer system outputting the at least one optimized course to a display interface of the at least one user path device accessible to the at least one user for directing the user to navigate from a starting point to at least one of the one or more future locations.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
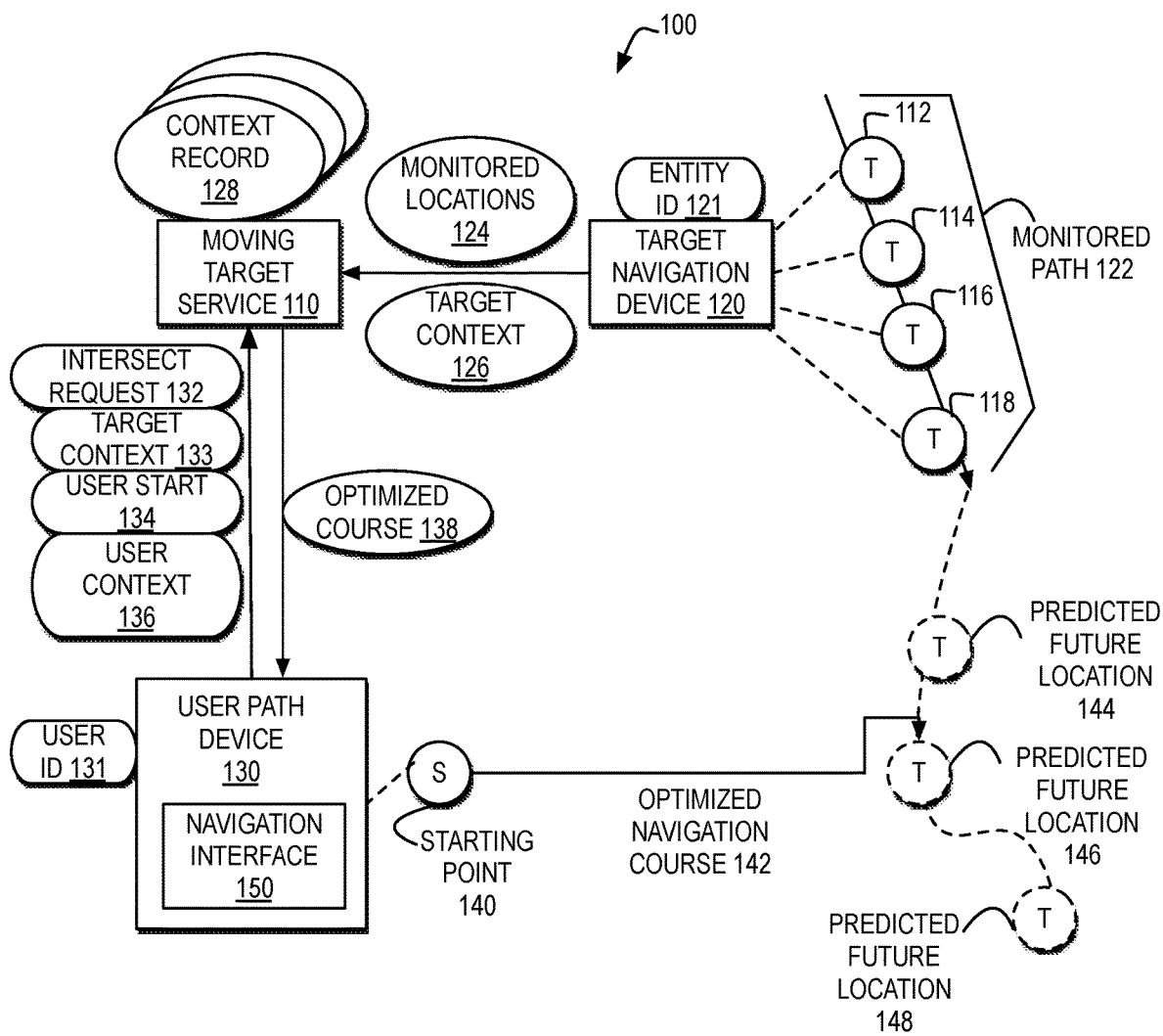
FIG. 1 illustrates one example of a block diagram of a moving target navigation system for directing navigation of a user to intersect with a moving target.

FIG. 1 illustrates a block diagram of a moving target navigation system for directing navigation of a user to intersect with a moving target.

In one example, a moving target navigation system 100, for directing user navigation to a moving target, may include a target navigation device 120 associated with a moving target identified by an entity identifier (ID) 121, a user path device 130 associated with a user requesting to intersect with a moving target identified by a user ID 131, and a moving target service 110 for assessing one or more potential intersection points for the user to intersect with the target. In one example, target navigation device 120 is communicatively connected to moving target service 110 within a network environment and moving target service 110 is communicatively connected with user path device 130 within a network environment. In additional or alternate embodiments, moving target navigation system 100 may include additional or alternate moving target services, target navigation devices associated with one or more additional targets, and user path devices associated with one or more additional users, in addition to additional or alternate devices and services, communicatively connected in a network environment. In addition, the network environments may provide additional or alternate services in one more layers, such as cloud services in a cloud environment layer, for facilitating communication between target navigation device 120 and moving target service 110 and between moving target service 110 and user path device 130. While in the example illustrated moving target service 110, target navigation device 120, and user path device 130 are illustrated as separate devices and services, in additional or alternate embodiments, one or more components or functions of moving target service 110 may be implemented as additional or separate components of target navigation device 120 or user path device 130.

In one example, target navigation device 120 monitors locations of a moving target, illustrated as "T" in FIG. 1. In one example, target navigation device 120 may represent a device carried by a moving target that uses a location detecting system to determine and track the location and movement of the device, and therefore also the location and movement of the moving target carrying the device, at intervals. In one example, the moving target "T" may represent one or more types of moving entities identified by an entity ID 121, currently logged in at target navigation device 120, including, but not limited to, one or more persons, one or more animals, one or more vehicles, one or more transit vehicles, and one or more other movable objects.

In one example, target navigation device 120 may implement one or more types of location detecting systems that may detect one or more types of locations and movement including, but not limited to, a global positioning system (GPS), a cell tower position system, a wireless network position, an accelerometer, and a gyroscope. In one example, target navigation device 120 may represent multiple location detection systems, depending on the setting, such as, but not limited to, a GPS for detecting general coordinates and an indoor tracking system, such as an indoor positioning system (IPS), to track locations of users within a particular building, including, but not limited to, tracking a floor or level that a moving target is on and the location of a user within a building. In one example, an IPS may track a location of an object using a Bluetooth signal. In one example, an IPS may collect location information using radio waves, magnetic fields, acoustic signals, or other sensory information collected by mobile devices, magnetic positioning, and dead reckoning. In one example, the localized nature of an IPS may result in different types of system interfaces required to collect location information. In one example, an IPS may require at least three independent measurements to unambiguously find a location, however, for smoothing to compensate for stochastic errors, an IPS may include a sound method to reduce the error budget. In addition, an IPS may include information from other systems to adjust for physical ambiguities and enable error compensation.

In one example, for purposes of illustration, target navigation device 120 moves with a target entity, monitors multiple locations of a moving target "T", and records a time associated with each location, to detect a path of a moving target, as illustrated by monitored path 122. For example, monitored path 122 illustrates the sequential ordering of locations of a target detected by target navigation device 120 of a location 112, a location 114, a location 116, and a location 118. In one example, the selection of locations, time that each location is captured, and the order of locations may represent a monitored path 122 of detected locations. In one example the time between each location is fixed, for instance 1 minute intervals. The time may be shorter or longer depending on the velocity of the target. For example, if the target detected by the target navigation device is moving at 3 mph, then the time interval of 1 minute may represent 250 feet, but for an automobile traveling at 60 mph, the time interval of 1 minute may represent 1 mile.

In one example, target navigation device 120 may communicate the locations monitored in monitored path 122, as monitored locations 124 to moving target service 110 within one or more network environments. In one example, the monitored locations 124 may include one or more characteristics including, but not limited to, location coordinates, times values, acceleration values, orientation values, and velocity values. In one example, target navigation device 120 may send a separate communication for each of the locations in monitored path 122, as detected in real-time. In another example, target navigation device 120 may send one or more communications with multiple locations from monitored path 122, in intervals with variable time delay.

In one example, target navigation device 120 may communicate monitored locations 124 within a network environment by broadcasting monitored locations 124. In one example, one or more moving target services, such as moving target service 110, may be enabled to detect broadcasts of monitored locations within the network environment and read the broadcast of monitored locations 124. In another example, target navigation device 120 may communicate monitored locations 124 by pushing monitored locations 124 via an established or secure channel in a network environment to a specific moving target service, such as moving target service 110, authorized to access monitored locations 124. In another example, moving target service 110 may pull monitored locations 124 from target navigation device 120 via an established or secure channel in the network environment. In one example, one or more components of target navigation device 120 and moving target service 110 may be implemented as cloud computing services. In another example, additional or alternate services may be implemented for managing broadcasts and transmissions of monitored locations 124 from target navigation device 120 to moving target service 110.

In one example, in addition to target navigation device 120 communicating monitored locations 124, target navigation device 120 may communicate target context 126. In one example, target context 126 may include information that provides context for permitted uses of monitored locations 124 and potential future locations of the moving target. For example, target context 126 may include, but is not limited to, security preferences for access to and authorized uses of monitored locations 124, a history of previously monitored paths of the target, a mode of transportation of the target, scheduled events for the target from an electronic calendar, and a cognitive aspect impacting intersection with an entity carrying target navigation device 120.

In one example, cognitive aspects of intersecting with an entity carrying target navigation device 120 may include factors that are detectable through a cognitive computing service implemented through target navigation device 120, moving target service 110, user path device 130, or other services available within moving target navigation system 100. In one example, a cognitive computing service may specialize in processing and analyzing large, unstructured datasets. For example, a cognitive computing service may process and analyze large, unstructured data sets, implementing machine learning, reasoning, natural language processing, sentiment analysis, risk assessment, fraud detection, speech recognition, vision recognition, language translation, behavioral recommendations, and other services that mimic the functioning of the human brain and help with human decision-making. Social media can be used to predict with whom the user may meet. In one example, cognitive aspects of intersecting with an entity carrying target navigation device 120 may include, but are not limited to, modeling and predictions of different responses by the entity based on the direction the entity is approached from and the types of locations at which the entity would prefer to be intersected with, adjusted to reflect the familiarity the entity has with the user and the expectation the entity has of being approached. Target navigation device 120, for example, may include one or more sensors that monitor responses by the entity to different interactions with other users, detect context for the interactions, receive ratings and feedback from the entity for the interactions, and then analyze the responses, context, and feedback to predict one or more factors of cognitive aspects of intersecting with the entity.

In one example, moving target service 110 accesses monitored locations 124 for moving target "T" as monitored by target navigation device 120 and calculate at least one optimized course for one or more users to follow to intersect with moving target "T" at one or more predicted future locations of moving target "T". In one example, a predicted future location 144, a predicted future location 146, and a predicted future location 148 illustrate examples of predicted future locations of moving target "T".

In one example, moving target service 110 may calculate the optimized course by predicting one or more future locations of moving target "T" based on monitored locations 124 and one or more context record 128. In one example, context record 128 may specify the context for permitted uses of monitored locations 124, context for potential future locations of a moving target, context for potential future locations of a user requesting to intersect with a moving target, and user criteria specifying preferences for intersecting with the moving target.

In one example, moving target service 110 may access one or more context records, such as context record 128, from one or more sources. In one example, moving target service 110 may receive target context 126 from target navigation device 120 and apply target context 126 to context record 128. In another example, moving target service 110 may access one or more services for one or more of the target and a user, where the services provide context information regarding the user or target. In another example, moving target service 110 may receive user context 136 from user path device 130, where user context 136 may include information that provides context for user intersection preferences including, but not limited to, permitted uses of monitored locations 124 by the user, potential future locations that are preferred as intersection points for the user, a history of previously monitored paths of the user, a mode of transportation of the user, scheduled events for the user from an electronic calendar, social media connections and contact information of the user, and cognitive aspects of a user associated with user path device 130. In one example, scheduled events from an electronic calendar and other context available may indicate an event time and location, a history of the type of event, a history of whether a moving target or user is typically late or on time for the type of event, and the type of event, such as a business event, a non-work event, or an appointment. In addition, context record 128 may include current conditions such as, but not limited to, current and predicted weather, travel conditions, mode of travel, and time of day. In addition, context record 128 may indicate the type of transportation typically used by the user or the moving target for the type of event. Context record 128 may include transit routes, schedules, and actual locations, for transit including, but not limited to, automobile, train, subway and bus transit. Context record 128 may include user route preferences, such as a user preferring a particular type of transportation and the user preferring scenic routes. Context record 128 may include cognitive aspects of intersections with the moving target.

User path device 130 may send a request to moving target service 110 for directions for the user to intersect with moving target "T", shown moving in monitored path 122, as specified in an intersect request 132, identifying the user by user ID 131. In one example, intersect request 132 may specify one or more of a target specification (spec) 133, a user start 134, and user context 136. In one example, user path device 130 may implement a navigation interface 150 through which a user selects one or more preferences for target spec 133, user start 134, and user context 136 for intersect request 132.

Navigation interface 150 may include an interface to a navigation service that dynamically guides a user from a current location to a target location, such as, but not limited to, Google Maps and Apple Maps. General navigation services traditionally provide a navigation interface in which a user may enter a location of interest and the navigation service, knowing the user's current location, then identifies the shortest path between the user and the specific location, based on distance, time, user preferences such as not driving on highways or avoiding toll roads, and route conditions. General navigation services may receive or detect information about current roadway conditions such as average speeds, traffic conditions, and delays, and optimize a route for the user based on current conditions. For example, a user may enter an address of a restaurant into navigation interface 150 and a general navigation service may analyze and predict a fastest route, along with possibly showing alternate routes and times associated with alternate routes. Some general navigation service may include an interface through which a user can ask in natural language to get directions to a specific restaurant or store.

In the present invention, navigation interface 150 also provides an interface through which a user may select a moving target, rather than a fixed address, through entering one or more parameters of intersect request 132. In response to intersect request 132, navigation interface 150 receives, from moving target service 110, an optimized course 138, which may include specific predicted locations and may include recommended routes to specific predicted locations, to enable the user to efficiently and effectively navigate to intersect with a moving target. For example, in entering one or more parameters of intersect request 132, the user may know one or more of the following: (1) the moment to moment location of the moving target, but not any future location of the moving target; (2) the moment to moment locations of the moving target and an intended route, but not which location on the route is optimum for the user to intersect with the target; (3) that the user and moving target agree to meet and jointly agree that the meeting location should be determined based on movement, rather than a predetermined fixed location; (4) a final location of a moving target for a time period, but not a route of the moving target where the user may more efficiently intersect with the moving target; (5) a service provided by the moving target, but not the location of the moving target. By navigation interface 150 interacting with moving target service 110 to receive optimized course 138 for the user to intersect with a moving target, a user is provided with optimized navigation services.

In one example, target spec 133 may specify a particular target, such as by identifying a particular entity ID. In another example, target spec 133 may specify a particular type of target or a particular type of service provided by the target. In one example, a type of target may be identified by one or more classifiers including, but not limited to, a type of virtual target or a group identifier for a group of moving targets. In yet another example, target spec 133 may specify a target crowd density within a range and one or more criteria for the crowd, such as users of a particular augmented reality service. In another example, user path device 130 may implement a service that automatically selects and specifies target spec 133 with a particular moving target identified by an entity ID, a type of target, or a service provided by the target based on selections by a user in an application interface for a service provider that indicate a user may request to intersect with a moving target. In addition, user path device 130 may automatically select an entity ID, a type of target, or a service provided by the target based on events scheduled in a user calendar that indicate a user may request to intersect with a moving target. In another example, user path device 130 may automatically select an entity ID, a type of target, or a service provided by the target based on cognitive aspects identified through navigation interface 150 of user path device 130 that indicate a user may need to or request to intersect with a moving target. In addition, in another example, user path device 130 may automatically select an entity ID, a type of target, or a type of service requested based on information available to user path device 130 that indicates a user may request to intersect with a moving target.

In one example, moving target service 110 may receive intersect request 132 and first determine whether a user is authorized to access the entity ID or service requested, where moving target service 110 may identify authorization permissions for the user identified by user ID 131 from context record 128. In one example, if the user is authorized to access the entity ID or service requested, then moving target service 110 may determine if monitored locations 124 are available from one or more moving targets specified by target spec 133 of intersect request 132. If monitored locations 124 are available from one or more moving targets specified by target spec 133 of intersect request 132, moving target service 110 may determine predicted future locations for the one or more moving targets based on monitored locations 124 and context record 128.

In one example, moving target service 110 may optimize the course recommended to the user by analyzing one or more of the predicted future locations according to one or more criteria. For example, moving target service 110 may determine whether any of the predicted future locations have restricted access, such as including security checkpoints which a user would be required to have a security clearance to enter. In addition, moving target service 110 may determine whether any of the predicted future locations conflict with cognitive aspects of the intersect with the moving target, such as if a location is determined as not suitable for the particular user to intersect with a moving target, such as if a predicted future location is in a doctor's office and the user is requesting to intersect with the moving target who is a business associate. In addition, moving target service 110 may determine whether there are limitations to the accessibility of any predicted future locations that require approaching the predicted future location from a particular direction, elevation, or speed. Further, moving target service 110 may determine whether there is a particular direction from which the moving target should be approached to increase the probability that the user will intersect with the moving target and the probability that the moving target will acknowledge the user.

In addition, moving target service 110 may calculate an optimized course 138 for the user to access the moving target at one of the predicted future locations. In one example, optimized course 138 may include a selection of one or more of the predicted future locations, where the selection of one or more predicted future locations are the locations most likely to provide an optimized course for the user to intersect with the moving target "T". In another example, optimized course 138 may include a selection of one or more of the predicted future locations and one or more optimized pathways for travel to the one or more of the predicted future locations, including a direction, elevation, and speed of approach. In one example, optimized course 138 may include one or more recommendations of modes of transportation. In addition, in one example, optimized course 138 may include one or more optimized start times for the user to start navigation to intersect with the moving target at a selection of one or more of the predicted future locations and may also indicate one or more times by which the user must start to avoid being too late to intersect with the moving target. In addition, in calculating optimized course 138, moving target service 110 may evaluate and minimize the delay and energy expended by the user and moving target "T" in the optimized pathways and future locations.

In one example, a starting point "S" 140 identifies one or more of a starting location and a starting time of a user requesting to navigate to intersect with moving target "T". In one example, in identifying a starting location, starting point "S" 140 may identify one or more of location coordinates, including a current location or a future location, and a range of locations. In one example, in identifying a starting time, starting point "S" 140 may identify a particular time, including a current time or a future time, a range of times, or a time of "as soon as possible".

In one example, user path device 130 may include starting point "S" 140 in intersect request 132 as user start 134, including both a start location and a start time. In one example, user start 134 identifies starting point "S" 140 to provide origin information for use by moving target service 110 in identifying optimized course 138. In one example, user context 136 may include additional information about a user's starting point, such as, but not limited to, modes of transportation available to the user, modes of transportation preferred to be used by a user, a budget for the user to pay fees for one or more of the available modes of transportation, windows of time available to the user, a maximum travel time, a maximum time to wait, a priority level for the intersect, and additional context that impacts the origins of the user's navigation to intersect with moving target "T". In one example, fees for one or more available modes of transportation may include fees required for accessing the transit option, such as subway and bus fares, or fees required for engaging the transit option, such as a taxi fare or a road toll. In another example, user start 134 may only include a location or a time for starting point 140, but not both a location and a time. In another example, user path device 130 may determine starting point 140, but not send starting point 140 as in intersect request 132 to moving target service 110 to selectively protect access to the starting location of the user, such as if the starting location is a user's home address or other location that the user requests not to publish.

In one example, user path device 130 may receive optimized course 138 from moving target service 110, determine one or more navigation pathways for the user to navigate from starting point "S" 140 to one or more of the selection of predicted future locations in optimized course 138, and output at least one optimized navigation course 142 for the user in navigation interface 150 for directing the user to navigate from starting point "S" 140 to an intersection point with the moving target as specified in optimized course 138. In the example, user path device 130 selects to output an optimized navigation course 142, from starting point "S" 140 to predicted future location 146 in navigation interface 150. In another example, user path device 130 may select to output multiple optimized navigation course options in navigation interface 150, where the user is enabled to select a particular optimized navigation course from among the multiple optimized navigation course options and begin navigation on the selected course. In another example, user path device 130 may select to output multiple optimized navigation course options in navigation interface 150 that are further specified according to mode of transportation required, budget for transportation costs, accessibility issues, and other differences between the routes.

In one example, navigation interface 150 may interface with a dynamic navigation service of moving target service 110 for generating a navigation course and directing user navigation along optimized navigation course 142. In another example, navigation interface 150 may access a separate general navigation service for generating optimized navigation course 142 based on one or more locations and course recommendations in optimized course 138.

In one example, user path device 130 may periodically or continuously monitor the location of user path device 130 through a location detection system. In one example, in response to a user selecting to start navigation towards the moving target "T" on optimized navigation course 142, user path device 130 manages updates to navigation interface 150 showing a current location of the user with respect to moving target "T". In one example, moving target service 110 may continue to monitor the location of moving target "T" as reported by target navigation device 120 and provide updates to the location of moving target "T" in optimized course 138 to user path device 130, for output in navigation interface 150. In addition, as moving target service 110 monitors the location of moving target "T" as reported by target navigation device 120, moving target service 110 may determine whether moving target "T" is reaching predicted future locations or whether the actual path of moving target "T" has diverged from the predicted future locations. In one example, if moving target service 110 detects that the actual path of moving target "T has diverged from the predicted future locations, moving target service 110 may automatically dynamically adjust the predicted future locations of moving target "T" and send the dynamically adjusted predicted future locations in optimized course 138 to user path device 130. User path device 130, in response to detecting conditions that change the optimization of navigation course 142, whether the conditions along the navigation path have changed or whether the predicted future location of moving target "T" has changed, may update navigation interface 150 user with an indicator of changes to optimized navigation course 142 in response to changes to conditions along the navigation path or the predicted future location of moving target "T".

In one example, moving target service 110 may determine whether and how to alert the moving target that the user has selected to navigate to intersect with the moving target. In one example, the moving target may set a condition that the moving target's location may only be shared with the user if moving target service 110 alerts the moving target, via target navigation device 120, to potential intersect locations identified in an optimized course sent to a user. In another example, the moving target may pre-authorize selected users to access the moving target's location at any time, within a radius, or within a time window and specify cognitive aspects of intersections with the pre-authorized users, but request that moving target service 110 not interrupt the moving target with alerts to potential intersections with pre-authorized users. In another example, target navigation device 120 may not be equipped with an interface for receiving information and outputting information from moving target service 110.

In one example, in the present invention, navigation interface 150 provides an interface through which a user riding a bicycle, who needs to intersect with another person riding a bicycle or a truck, such as a delivery truck, may enter the identifier of the person riding the bicycle or an identifier for a delivery truck service for the truck, rather than entering a particular location of the person riding the bicycle or the identifier for the delivery truck service into a general navigation service. Moving target service 110 determines one or more predicted future locations of the moving target and provides navigation interface 150 with one or more locations, and one or more routes, for the user to navigate, on a bicycle, to likely intersect with the other person riding the bicycle or the delivery truck. In one example, traffic conditions, road blocks, and other factors may factor into the predicted future locations from moving target service 110, providing the user on the bicycle with a more reliable and efficient route to intersect with one of the moving targets than the user would have if the user had entered a static address into a general navigation service.

In another example, in the present invention, navigation interface 150 provides an interface through which a drone, which needs to intersect with a person or vehicle that is moving may enter the identifier of the moving target, rather than a fixed delivery location. Moving target service 110 determines one or more predicted future locations of the person or vehicle and provides navigation interface 150 with one or more locations, and one or more routes, to direct the automated navigation of the drone to efficiently intersect with the person or vehicle. In one example, where the drone delivers a particular service or product, the drone may select one or more moving targets from among people or other entities with entity IDs indicating a preference for the service or product and offer the product or service to the person or other entities at intersect points selected by the drone.

In another example, in the present invention, navigation interface 150 provides an interface through which a tourist who wants to intersect with a tour guide who is moving may enter the identifier of the tour guide service, provided to the user after registering with the tour guide service, rather than a fixed location of a particular tour guide. Moving target service 110 determines one or more predicted future locations of one or more tour guides within a particular range of the tourist and provides navigation interface 150 with one or more locations, and one or more routes, to direct the tourist to intersect with one of the tour guides at locations identified as entry or other points for a guided tour. In one example, if a user is on a tour and wants to stay at a particular location longer than the tour group, but catch up with the tour group at a later stop, navigation interface 150 may identify one or more locations for the user to navigate to in order to catch up with the tour group.

In another example, in the present invention, navigation interface 150 provides an interface through which a user may receive notifications of the temporary location of a personality that the user follows on social media. For example, a book author may select to remove a location restriction setting that restricts access to on the book author's location for a time period, to promote the book author's location during a book signing. A user may set a preference in an intersect request to receive automatic alerts if personalities followed by the user on social media are located within a particular distance range of the user. Moving target service 110 may determine which users have preferences set for receiving the location of the book author during the time when the book author's location restriction setting is removed, identify a time period during which the location of the author is accessible to the user, and one or more routes to the location, and provide navigation interface 150 with the routes and time window for intersecting with the author at the book signing location.

In another example, in the present invention, navigation interface 150 provides an interface through which a person who is traveling to a train station, but who misses their train, may enter an identifier for the train, rather than entering a particular train stop location, to request the most efficient route to meet up with the train in the future. Moving target service 110 determines one or more predicted future locations of the train from the train schedule and provides navigation interface 150 with one or more locations, and one or more routes, that are the most efficient for the user to take to meet up with the train rather than passively waiting for the next train.

In another example, in the present invention, navigation interface 150 provides an interface through which a person who is currently traveling by a type of transportation, such as a cruise ship, who disembarks and then misses re-embarking before the cruise ship leaves port, may enter an identifier for the cruise ship, to request the most efficient route to meet up with the cruise ship in the future, such as a next port of call or via a helicopter. Moving target service 110 determines one or more predicted future locations and times of the cruise ship from the cruise ship schedule and provides navigation interface 150 with one or more locations, and one or more routes, that are most efficient for the user to take to meet up with the cruise ship.

In one example, in the present invention, navigation interface 150 provides an interface through which a person who is attempting to intersect with an athlete who is on a long-distance run or bike ride, where the start and end point of the run or cycling route are known, but otherwise the route is flexible, may request two different points at which to intersect with the moving athlete to provide a rest stop. Moving target service 110 may determine one or more predicted future locations of the moving athlete and provide navigation interface 150 with the one or more predicted future locations, and one or more routes, to two different points that are the most efficient for the user to take to meet up with the moving athlete multiple times during the route.

Figure 2:
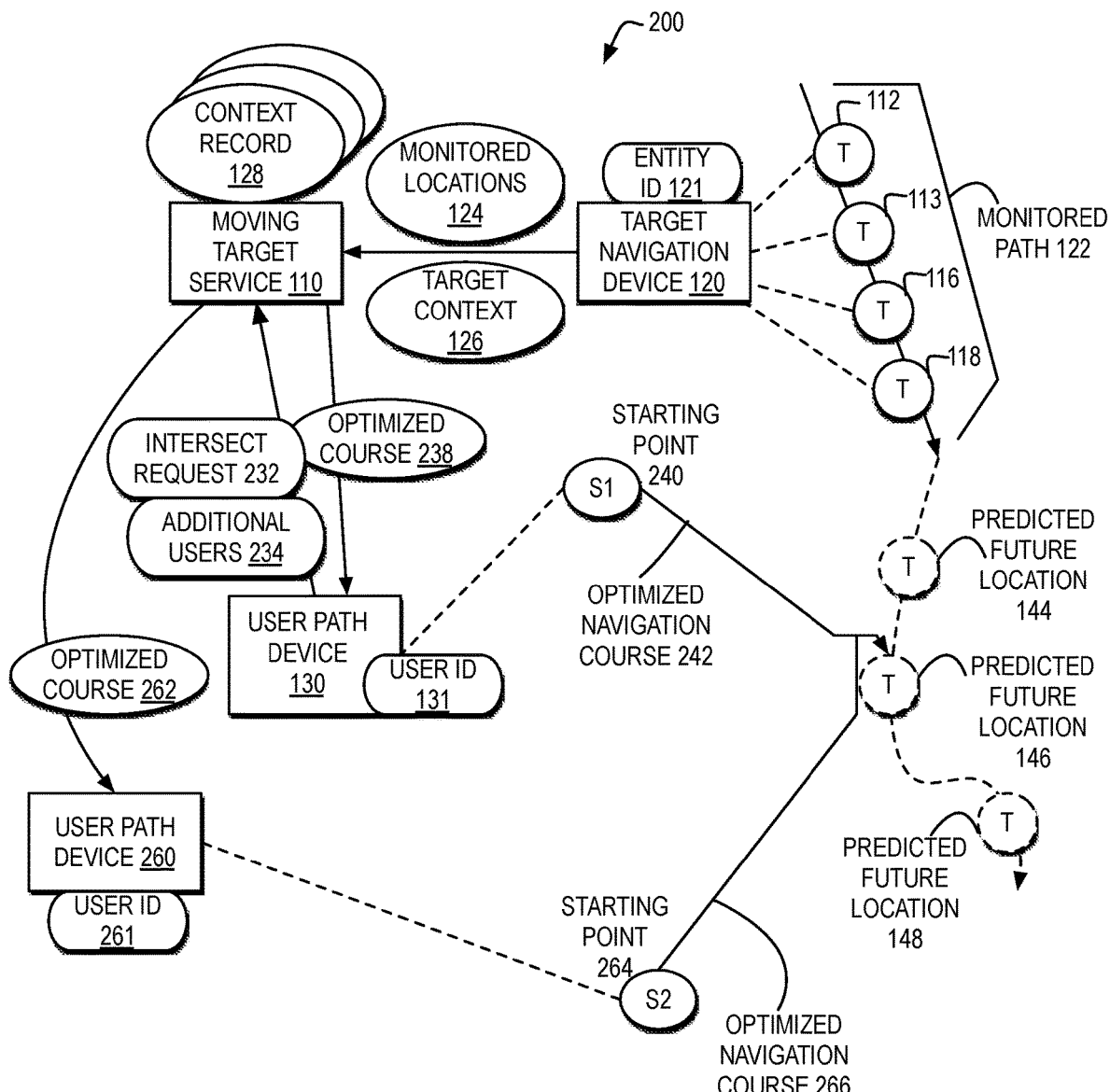
FIG. 2 illustrates one example of a block diagram of a moving target navigation system for directing navigation of multiple users to intersect with a same moving target at a same location, minimizing the total delay of each user and the energy expended by both users.

FIG. 2 illustrates a block diagram of a moving target navigation system for directing navigation of multiple users to intersect with a same moving target at a same location, minimizing the total delay of each user and the energy expended by both users.

In one example, a moving target navigation system 200 may manage selection of optimized courses for two different users, starting from two different locations, to intersect with a same moving target at a same location on an optimized course that minimizes the total delay of each user and the moving target and minimizes the energy expended by both users. In particular, where three or more parties need to intersect at a same location and each of the parties is moving, moving target navigation system 200 may determine and guide a meeting location for the parties that minimizes travel times, minimizes delays, including average delays and maximum delays, minimizes energy expended, which may be measured by scaling factors, as more people move together as a group.

In one example, in moving target navigation system 200, moving target "T" is monitored by target navigation device 120 logged on to with entity ID 121, as described with reference to FIG. 1, along a monitored path 122. In one example, moving target service 110 receives an intersect request 232 that, in addition to specifying one or more of target spec 133, user start 134, and user context 136, may also specify additional users 234. In one example, additional users 234 specifies user IDs for one or more additional users, such as a user identified by user ID 261. In one example, by including one or more user IDs in additional users 234, intersect request 232 may specify a request for an optimized course to intersect with a same moving target "T" at a same future predicted location as the one or more users identified in additional users 234.

In one example, a single user may send an intersect request, such as intersect request 232, requesting an optimized course to intersect with a same moving target "T" at a same future predicted location as another user. In another example, each of the multiple users may send a separate intersect request, requesting an optimized course to insect with a same moving target "T", at a same future predicted location as another user. In one example, if only a single user requests an optimized course to intersect with a same moving target "T" at a same future predicted location as user ID 261, moving target service 110 may automatically determine an optimized course 238 for user ID 131 based on context available in intersect request 232 and any context available about user ID 131 in context record 128 and may automatically determine an optimized course 262 for user ID 261 based on any context available about user ID 261 in context record 128, where both optimized course 238 and optimized course 262 intersect with moving target "T" at predicted future location 146.

In one example, moving target service 110 determines predicted future location 144, predicted location 146, and predicted location 148, as described with reference to FIG. 1. In the example, even though starting point "S1" 240 for user ID 131 is closest to predicted future location 144 and starting point "S2" 264 for user ID 261 is closest to predicted future location 148, moving target service 110 determines optimized course 238 and optimized course 262 to minimize overall delays and minimized energy expended by both user ID 131 and user ID 261 to intersect with moving target "T" at a same predicted future location, which is illustrated as predicted future location 146. In the example optimized course 238 is applied by user path device 130 to generate an optimized navigation course 242 to guide user ID 131 to predicted future location 146 and optimized course 262 is applied by user path device 260 to generate an optimized navigation course 266 to guide user ID 261 to predicted future location 146.

In the example, in moving target service 110 determining which predicted future location would yield navigation courses that minimize the total delay time and minimize the energy expended by each user to intersect with the same moving target "T" at a same predicted future location, moving target service 110 may calculate delay time and energy expended for one or more modes of transportation available to each user. For example, while predicted future location 146 is illustrated as the predicted future location which would yield navigation courses that minimize the total delay time and minimize the energy expended by each user to intersect with the same moving target "T" at a same predicted future location if both users are using a default type of transportation, such as driving a vehicle, in additional or alternate embodiments, if different modes of transportation are considered for each user, moving target service 110 may identify a different predicted future location as the optimal predicted future location for both users to intersect with moving target "T".

In one example, user path device 130 receives optimized course 238 and finalizes optimized navigation course 242 from starting point 240 to predicted future location 146, with a mode of transportation recommendation to minimize delay time and minimize total energy use by the users, for output by user path device 130. In one example, user path device 260 receives optimized course 262 and finalizes optimized navigation course 266 from starting point 264 to predicted future location 146, with a mode of transportation recommendation to minimize delay time and minimize total energy use by the users, for output by user path device 260. In one example, as each of the users respectively starts navigation on optimized navigation course 242 and optimized navigation course 266, each user path device may monitor and report to moving target service 110 if conditions for the navigation course have changed in a manner that delays the meeting at future location 146. Moving target service 110 also continues to monitor whether the location of moving target "T" follows the predicted future location path. If moving target service 110 detects changes to predicted travel conditions and future location forecasting of entity ID 121, user ID 131, or user ID 261, then moving target service 110 may dynamically adjust the calculation of optimized course 238 and optimized course 262 to minimize the impact of the detected changes on the navigation courses of user ID 131 and user ID 261.

Figure 3:
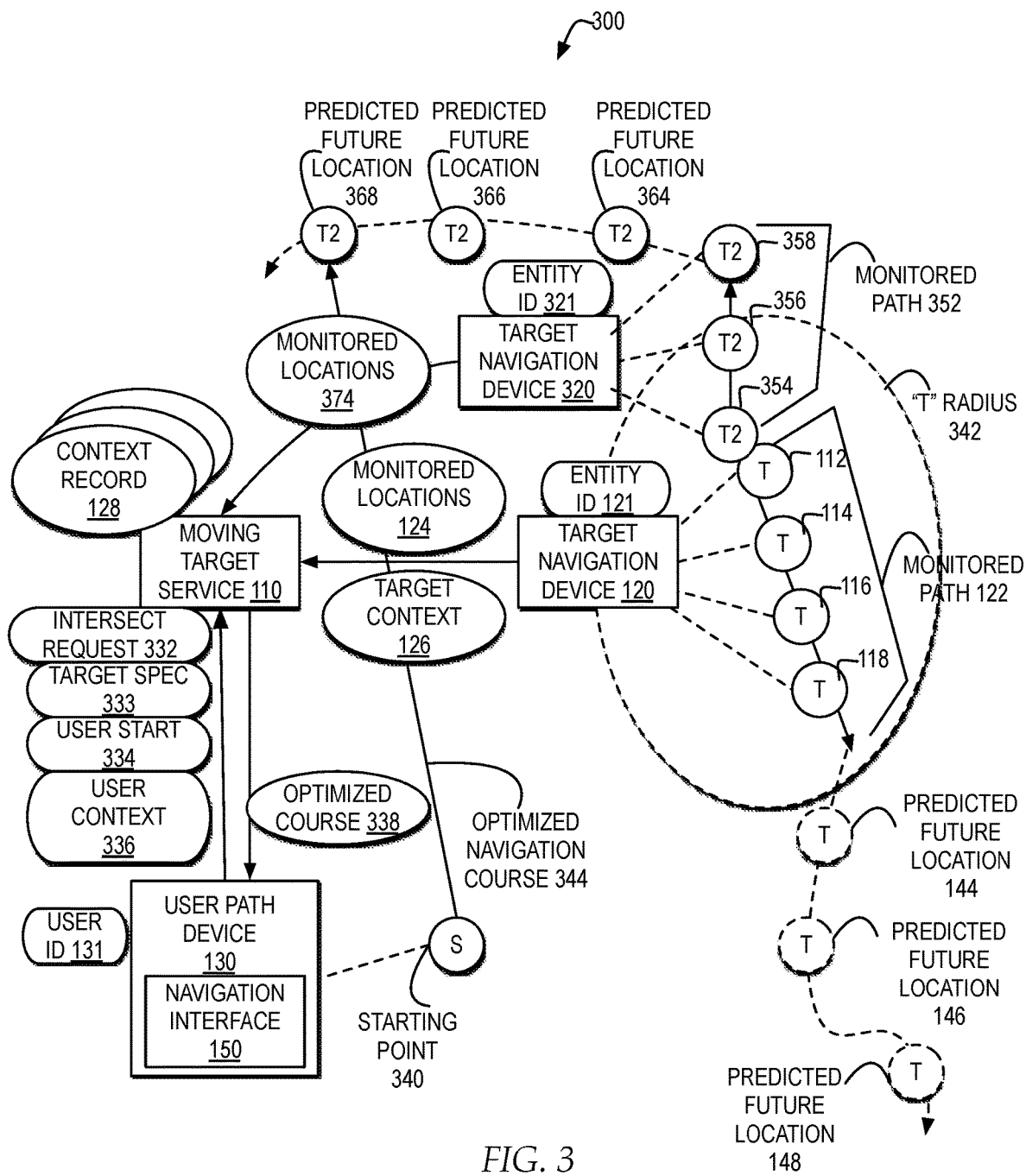
FIG. 3 illustrates one example of a block diagram of a moving target navigation system for directing navigation of a user requesting to intersect with a type of moving target providing a particular service, where the particular one or more moving targets is selected by moving target service.

FIG. 3 illustrates a block diagram of a moving target navigation system for directing navigation of a user requesting to intersect with a type of moving target providing a particular service, where the particular one or more moving targets is selected by moving target service.

In one example, a moving target navigation system 300 may manage selection of one or more moving targets from among available, registered moving target that provide a particular service requested by the user. In one example, an intersect request 332 sent by user path device 130, logged into by user ID 131, includes target spec 333, specifying a moving target matching a particular service. In addition, intersect request 332 may include a user start 334 identifying a starting point 340 with a range of locations and user context 336 identifying a mode of transportation available to the user, a budget for the navigation, a range of areas to navigate within, and a range of navigation times.

In one example, in response to moving target service 110 receiving intersect request 322 with target spec 333 specifying a particular service, moving target service 110 may determine a selection of one or more moving targets reporting monitored locations to moving target service 110 that provide the particular service. In one example, moving target service 110 may identify a selection of one or more services providing the particular service illustrated as a moving target "T" of entity ID 121 associated with target navigation device 120 and a moving target "T2" of entity ID 321 associated with target navigation device 320. In one example, target navigation device 120 provides monitored locations 124 to moving target service 110 and target navigation device 320 provides monitored locations 374 to moving target service 110.

In one example, moving target service 110 may detect monitored path 122 of entity ID 121 and predict multiple future locations illustrated as predicted future location 144, predicted future location 146, and predicted future location 148. In one example, moving target service 110 may detect a monitored path 352 of entity ID 321, including location 354, location 356, and location 358 from target navigation device 320, and predict multiple future locations illustrated as predicted future location 364, predicted future location 366, and predicted future location 368.

In one example, while moving target service 110 may determine one or more predicted future locations for each of the moving targets, to minimize the computational load on moving target service 110 performing future location prediction, moving target service 110 may limit a number of future location predictions based on the time range during which the user is requesting to navigate to intersect with a moving target. In one example, if user context 336 does not set a range of navigation times, moving target service may set a limit on the number, distance, and future time range of predicted future locations to minimize the computation time expended predicting future locations, to only a selection of predicted locations most likely to be within a range accessible to the user. In one example, based on the range of navigation times, moving target service 110 is illustrated as predicting three future locations of each moving target. In additional or alternate embodiments, moving target service 110 may predict additional or alternate numbers of future locations and distances of future locations.

In one example, while predicted future location 146 of moving target "T" is illustrated as the closest location to starting point 340, target context 126 may specify a radius of locations of moving target "T" that may be published to user ID 131 or where entity ID 121 may be published as providing the particular service. In one example, a "T" radius 342 illustrates the area defined by the radius of locations specified in target context 126 for monitored locations and predicted locations of entity ID 121. In one example, a delivery driver may specify, in target context 126, that the delivery driver is providing a delivery service only within "T" radius 342 during a particular time window. In another example, entity ID 321 may be associated with the delivery service at all times, without a radius specified.

In one example, while predicted future location 368 of moving target "T2" is farther away from the user than predicted future location 146 of moving target "T", at the current time, moving target service 110 may specify optimized course 338 with only predicted future location 368 because predicted future location 146 is currently unavailable to the user because it is outside "T" radius 342 for a time window when "T" radius 342 is applicable. In one example, moving target service 110 may also determine user ID 131 is authorized to access the predicted future locations of moving target "T2" before specifying optimized course 338 with predicted future location 368 of moving target "T2".

In one example, moving target service 110 may assess the one or more modes of transportation available to the user and the user budget for the navigation in determining which of predicted future location 364, predicted future location 366, and predicted future location 368 to recommend to the user as a particular predicted future location and mode of transportation to optimize the user's travel time, within the budget available to the user. In another example, moving target service 110 may calculate one or more of predicted future location 364, predicted location 336 and predicted location 368 as optimized locations for the user to intersect with moving target "T2" in optimized course 338. In one example, user path device 130 may finalize an optimized navigation course 344 based on optimized course 338 and output optimized navigation course 344 in navigation interface 150.

In one example, if predicted future location 364, predicted future location 366, and predicted future location 368 are outside the range of the navigation specified by the user in user context 336, moving target service 110 may return optimized course 338 with the options of the predicted future locations of moving target "T2", but with an option selected to prompt a user whether to select to monitor for another moving target providing the same particular service during another time window, within the range of navigation. In one example, moving target service 110 may collect historical data about times when the particular service is offered and determine a time window to recommend to the user requesting to intersect with a moving target providing the particular service within the range of navigation. User path device 130 may output the option in optimized course 338 through a selectable option in navigation interface 150. If the user selects the option in navigation interface 150, user path device 130 may send an updated intersect request 332 with the request for moving target service 110 to monitor for a moving target providing the particular service within the range of navigation "as soon as possible" or during a particular future time window. When moving target service 110 detects a moving target providing the particular service within the range of navigation for intersect request 332 as updated, moving target service 110 may send optimized course 338 to user path device 130 with predicted future locations of the moving target and an alert to the user that a moving target has been identified meeting the criteria of intersect request 332.

Figure 4:
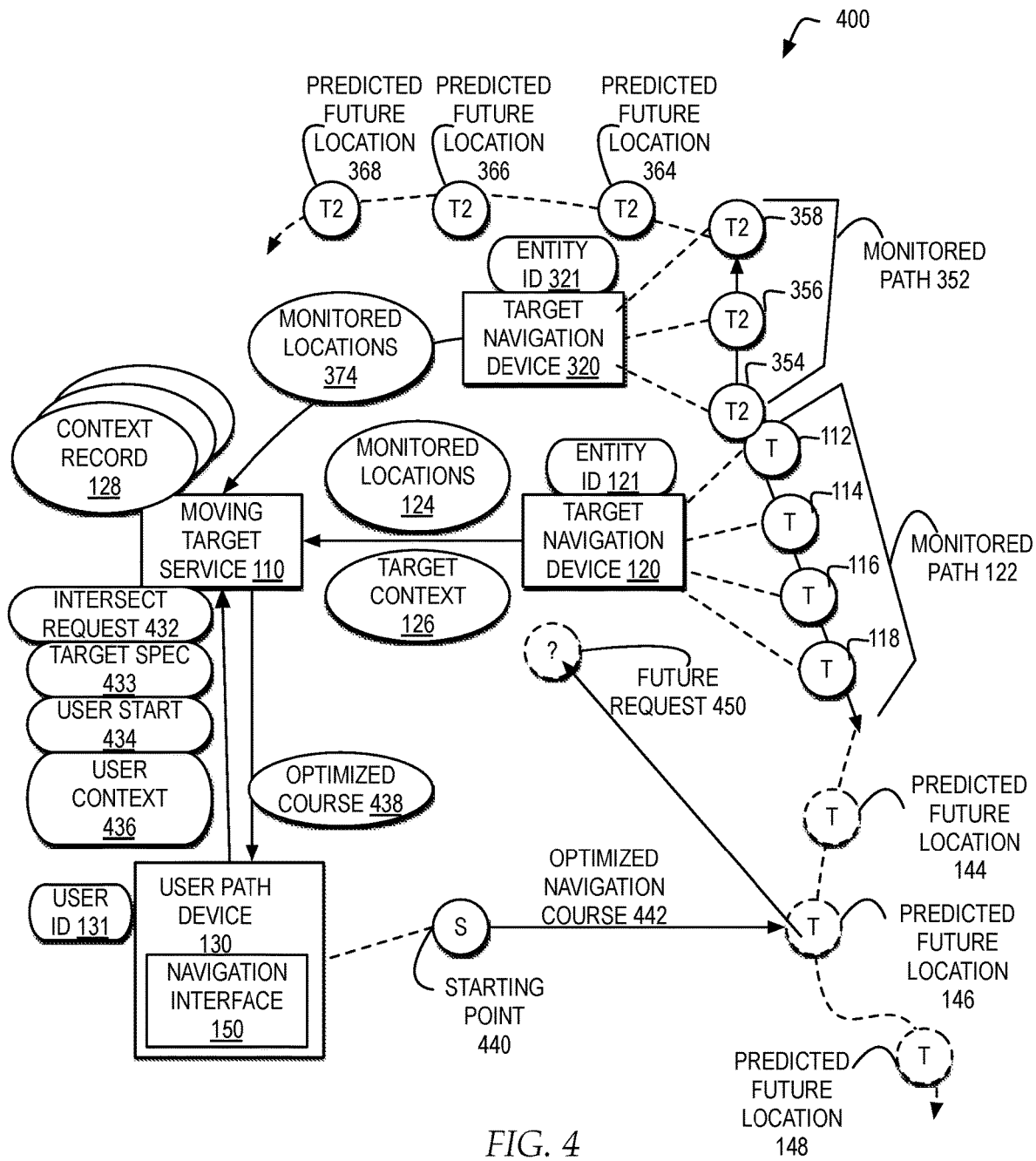
FIG. 4 illustrates one example of a block diagram of a moving target navigation system for directing navigation of a user requesting an optimized course to intersect with multiple moving targets from a current user starting point to minimize the total travel path of the user.

FIG. 4 illustrates a block diagram of a moving target navigation system for directing navigation of a user requesting an optimized course to intersect with multiple moving targets from a current user starting point to minimize the total travel path of the user.

In one example, a moving target navigation system 400 may manage the determination of an optimized course to intersect with multiple moving targets from a current starting point to minimize the total travel path of the user. In one example, an intersect request 432 sent by user path device 130, logged into by user ID 131, includes target spec 433, specifying multiple moving targets. In one example, the moving targets may be specified by a particular entity ID or may be specified by a particular service with a number of moving targets specified. In addition, intersect request 432 may include a user start 434 identifying a starting point of "as soon as possible" from a current location and user context 436 identifying one or more modes of transportation available to the user and a budget for transportation.

In one example, moving target "T" associated with entity ID 121 and moving target "T2" associated with entity ID 321 are the moving targets identified by moving target service 110 from the criteria specified target spec 433. In one example, in response to moving target service 110 confirming the user is authorized to access predicted future locations of both entity ID 121 and entity ID 321, moving target service 110 may determine whether it is feasible for the user to intersect with both moving target "T" and moving target "T2" given the distance of reliable predicted future location forecasting available to moving target service 110 and the travel time required to move from one target to the other target, further limited by the selected modes of transportation and budget for transportation. In particular, the percentage probability of predicted future locations, associated with reliability, may decrease over time or distance, or a combination of time and distance. In one example, moving target service 110 may determine that for the distance of reliable predicted future location forecasting available to moving target service 110, moving target 110 cannot determine a feasible optimized course to intersect with moving target "T" and moving target "T2" at a current time, even if the fastest form of available transportation is available to the user. In particular, in the example, while moving target "T" and moving target "T2" are illustrated in close proximity to one another when intersect request 432 is submitted by the user, during the time required for the user to travel to the initial locations of moving target "T" and moving target "T2", the paths of the moving targets are predicted to diverge. Moving target service 110 may return optimized course 438 with a recommendation that the user navigate to predicted future location 146 to intersect first with moving target "T", in a manner that minimizes the total travel path of the user, and that the user also select to update intersect request 432 with the second leg of the navigation scheduled to be set later, to be determined based on the location and predicted future locations of moving target "T2" at the point the user reaches moving target "T" at predicted future location 146. In one example, optimized course 438 may indicate a predicted direction of travel from predicted future location 146. In one example, user path device 130 may finalize optimized course 438 as optimized navigation course 442 in navigation interface 150, illustrating a navigation path from starting point 440 to predicted future location 146, and a next navigation path leading to a currently unknown location to be determined by a future request 450, identified by a "?", in the predicted direction of travel.

In one example, in minimizing the distance and time of the total travel path of the user to intersect with multiple moving targets, moving target service 110 may determine which mode of transportation most likely minimizes the distance and time of the total travel path of the user, within the user's budget set for transportation fees. In one example, moving target service 110 may determine that during a current time period, a particular form of transit is most likely to minimize the total travel path of the user based on the predicted future locations available to moving target service 110.

In one example, when a user submits target spec 433 identifying multiple moving targets and the user begins navigating on optimized navigation course 442, moving target service 110 continues to monitor the moving target's actual path and user's actual route for changes from the predicted future locations of both moving target "T" and moving target "T2" and may dynamically adjust optimized course 438 to continue to optimize the user's navigation path to minimize the total travel time, along with minimizing any transportation fees, given the changes to the predicted conditions and locations.

Figure 5:
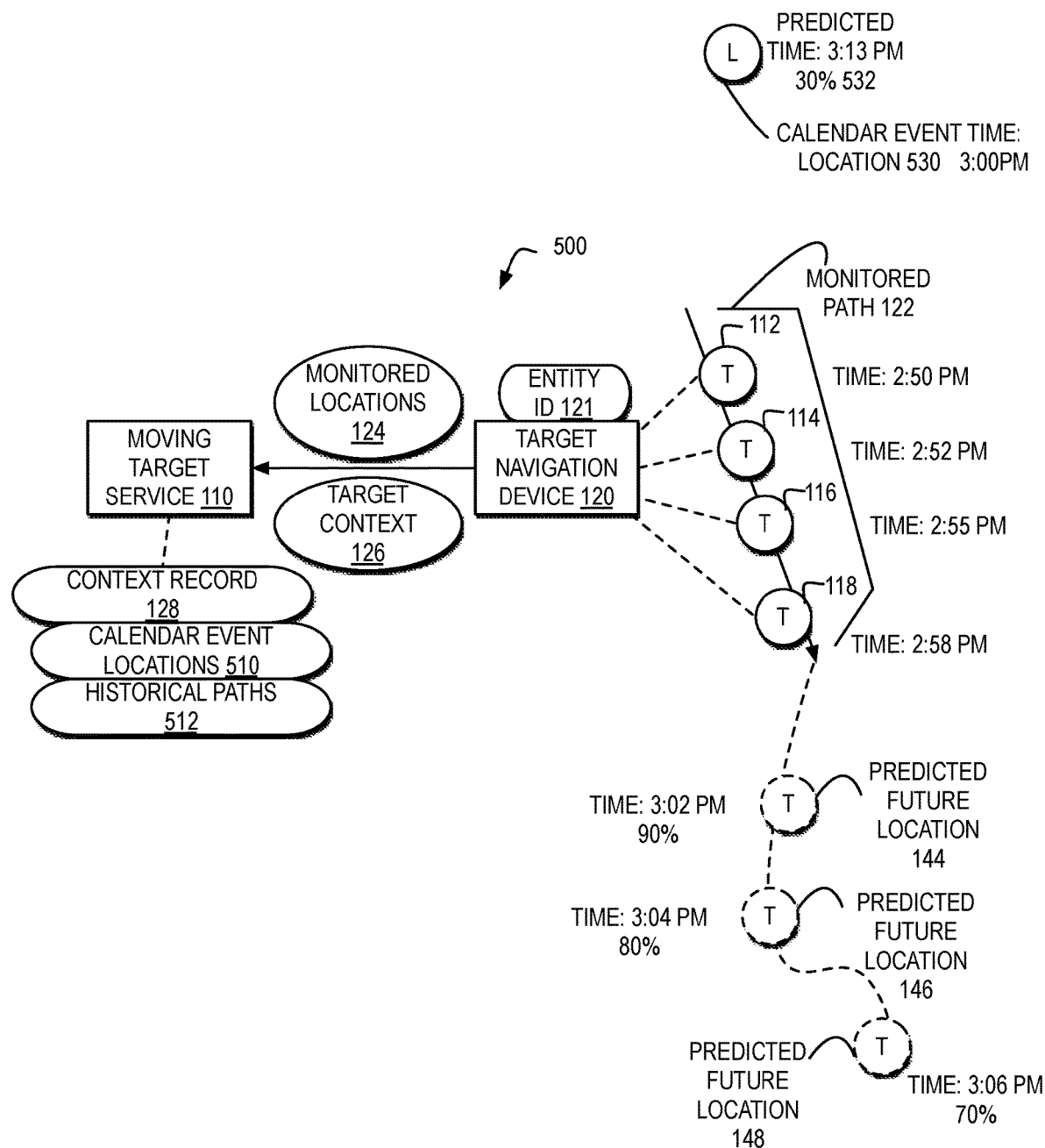
FIG. 5 illustrates one example of a block diagram of a moving target navigation system for predicting one or more future locations of a moving target based on context records with information inconsistent with current movement of a moving target.

FIG. 5 illustrates a block diagram of a moving target navigation system for predicting one or more future locations of a moving target based on context records with information inconsistent with current movement of a moving target.

In one example, moving target service 110 may access context record 128 for entity ID 121, including one or more of calendar event locations 510 and historical paths 512. In one example, target navigation device 120 provides monitored locations 124 to moving target service 110, including multiple locations in monitored path 122, each marked by a timestamp. Moving target service 110 receives the locations of monitored path 122, with time stamps, and detects a direction of travel based on the order of timestamps at the locations. In the example, a last timestamp in monitored path 122 is a time "2:58 PM", at a location that is heading away from a location "L", which is a calendar event location 530, with a scheduled start time of "3:00 PM" in calendar event locations 510. In one example, moving target service 110 predicts, based on the direction of travel of the user and the limited time for the user to travel a distance that is at least 15 minutes away by available modes of transportation, that the user is not planning to attend the event as scheduled. Moving target service 110 may access historical paths 512, which may include paths recorded for the current time period and paths recorded for the locations and direction of travel recorded in monitored path 122. In one example, moving target service 110 may identify, based on paths recorded in historical paths 512 for the current time period and for the current location of the moving target and direction of travel, that the moving target is following a path that includes predicted future location 144 at a time "3:02 PM", predicted future location 146 at a time "3:04 PM", and predicted future location 148 at a time "3:06 PM". In addition, moving target service 110 may identify that based on the travel modes available to the user, if the user were to change course and attend the event scheduled in the user's electronic calendar, the predicted arrival time is "3:13 PM", as illustrated at reference numeral 532.

In the example, moving target service 110 may determine that because of the direction of travel of the moving target away from calendar event location 530 at a time when the moving target is anticipated to be moving towards calendar event location and the length of the travel time for the user to reach calendar event location 530 exceeding a time threshold, calendar event location 530 is inconsistent with the moving target's actual movement.

Moving target service 110 may determine that the moving target's current movement is inconsistent with scheduled events, but weigh the frequency with which the user follows the paths in historical paths 512 and weigh the importance of the calendar event, in predicting whether to discard calendar event location 530 as a factor in predicting future locations.

In one example, as an alternative to discarding calendar event location 530 as inconsistent with the moving target's current movement, moving target service 110 may also determine multiple potential courses, in different directions, and provide the user with each course, indicating a percentage of probability associated with each course, and with each location within each course. For example, moving target service 110 may provide an optimized course to a user that includes a first optimized course, set at a highest percentage of probability, illustrated as "90%" at predicted future location 144. The first optimized course may include a next percentage of probability illustrated at 80% at predicted future location 146. The first optimized course may include a subsequent percentage of probability illustrated at 70% at predicted future location 148. In addition, moving target service 110 may provide a second optimized course, set at a lower percentage of probability, which includes calendar event location 530, at a predicted time of "3:13 PM" at 30%. In addition, as a moving target continues to move, moving target service 110 may dynamically adjust the percentages assigned to each of the predicted locations based on the user's actual path and alternatives available. For example if the user is on a rural highway, then predicting the path is based solely on the path of and speed limit on the rural highway, however there may be multiple alternative paths in cities. Moving target service 110 may provide the probability percentages in the optimized course sent to the user path device, where a navigation interface of the user path device may dynamically adjust the navigation paths displayed to the user to reflect the probability percentages of each predicted future location.

Figure 6:
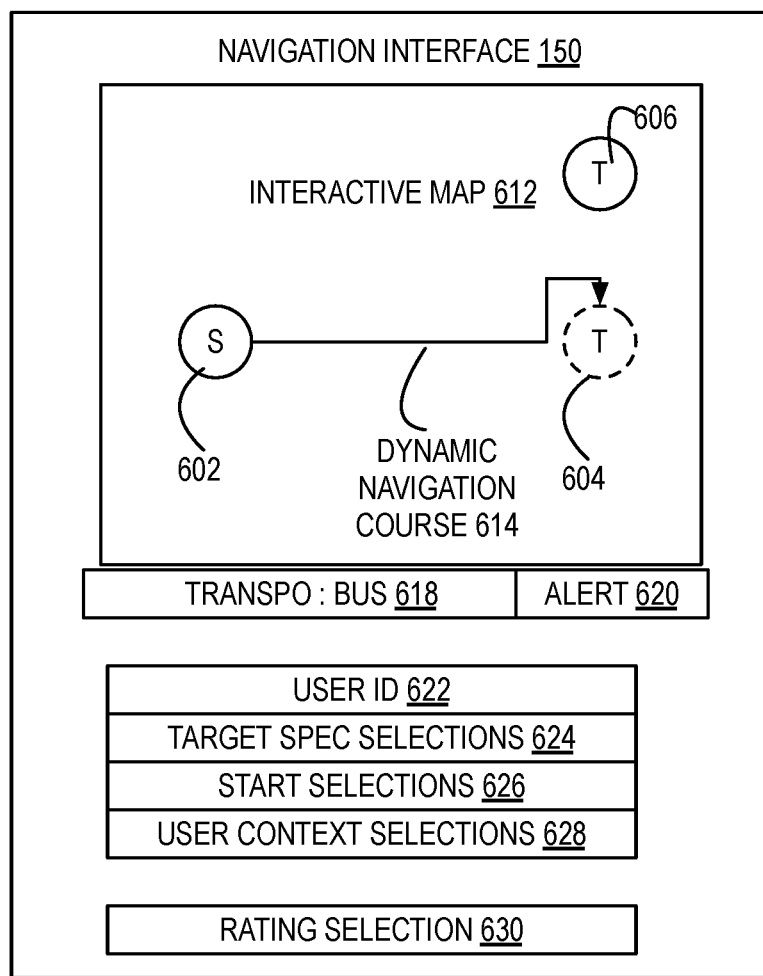
FIG. 6 illustrates one example of a block diagram of one example of a navigation interface of a user path device in a moving target navigation system.

FIG. 6 illustrates a block diagram of one example of a navigation interface of a user path device in a moving target navigation system.

In one example, a navigation interface 150 may include an interactive map 612. In addition, in one example, navigation interface 150 may include an alert indictor 620 that outputs one or more types of alert outputs for one or more types of conditions that trigger an alert to a user.

In one example, interactive map 612 may provide an output interface in which a navigational map is illustrated, such as a topographical map, street map or satellite image, where the portion of the navigational map illustrated within interactive map 612 may dynamically adjust based on a relative position of a user location on the navigational map. In addition, interactive map 612 may dynamically adjust based on a relative position of the moving target on the navigational map. For example, within interactive map 612, the relative position of a user in relation to the locations identified in interactive map 612 may be illustrated by a marker, such as "S" 602. In one example, as the user's position changes, the position of "S" 602 in interactive map 602 is dynamically adjusted to reflect the user's current relative position in relation to the locations identified in interactive map 612.

In one example, interactive map 612 may also illustrate the predicted location of the moving target at a point selected for the user to intersect with the moving target by a marker, such as "T" 604, as provided by moving target service 110. In one example, interactive map 612 may also output a dynamic navigation course 614 between "S" 602 and "T" 604, where dynamic navigation course 614 guides the user on a specific navigational path to intersect with the moving target.

In one example, moving target service 110 and user path device 130 may monitor for changes to the conditions along dynamic navigation course 614 as the user navigates on the path and, if there is a significant change to the conditions along dynamic navigation course 614 that would delay or impede the user in intersecting with the moving target at "T" 604, may update dynamic navigation course 614 within interactive map 612 to reroute the user via a different route that will allow the user to intersect with the moving target at "T 604 or may adjust the location of "T" 604 and adjust dynamic navigation course 614 to a different location for the user to intersect with the moving target. In one example, if a user's route via dynamic navigation course 614 is changed, interactive map 612 may output one or more indicators of the course change, including prompting the user to select whether to approve the course change. In one example, navigation interface 150 may include a specific indicator for alert indicator 620 that indicates when changes occur to dynamic navigation course 614 and may indicate a level of change.

In one example, moving target service 110 may also continue to monitor the actual location of the moving target and, if the moving target's actual location changes course from the predicted location, then moving target service 110 may provide updates to user path device 130 with an updated predicted location of the moving target. In one example, in response to the path of the moving target diverging from the predicted future locations of the moving target, navigation interface 150 may update interactive map 612 with an updated intersection location for "T" 604 and update dynamic navigation course 614 with an updated route for the user to intersect with the moving target. In one example, if the user's route via dynamic navigation course 614 is changed, interactive map 612 may output one or more indicators of the course change, including prompting the user to select whether to continue the route to the updated intersect location and indicating the updated time of the intersection on interactive map 612.

In one example, if moving target service 110 provides a current location of a moving target to user path device 130, in addition to providing a predicted future location selection in an optimized course, interactive map 612 may include an indicator of a current position of the moving target relative to the locations illustrated in interactive map 612 at "T" 606. In one example, if moving target service 110 continues to update the current location of the moving target in the optimized course updates to user path device 130, navigation interface 150 may dynamically adjust the position of "T" 606 within interactive map 612 to reflect the current position of the moving target relative to the mapped locations.

In one example, in addition to showing a route of dynamic navigation course 614, navigation interface 150 may also include a type of transportation recommended for the route, as illustrated by a transportation indicator 618. In one example, the transportation indicator illustrated is "transpo: bus". In one example, interactive map 612 may illustrate multiple route options for the user to intersect with the moving target, where the user may select between the multiple route options. In one example, transportation indictor 618 may represent a selectable button where in response to a user selecting transportation indicator 618, interactive map 612 may dynamically adjust to a route for a different transportation option. In another example, if there is not a feasible option available for the user to intersect with the moving target, navigation interface 150 may display an indicator that shows that no intersection point is possible with the current settings.

In one example, navigation interface 150 may also include an option for a user to select one or more selectable options that specify an intersect request sent by user path device 130 to moving target service 110. In one example, a user may select to log in under a particular user account, identified by user ID 622. In addition, a user may select target spec selections 624, start selections 626, and user context selections 628. In one example, user selections of target spec selections 624, start selections 626, and user context selections 628 may include selections specified for a particular request and general preferences selected for all requests.

In one example, target spec selections 624 may include, but are not limited to, a user selection of one or more particular entity IDs for one or more moving targets, one or more types of services provided by one or more moving targets, one or more types of virtual activities performed by the one or more moving targets, one or more densities of moving targets within a particular area, and one or more additional or alternate specifications for selection of a moving target. In one example, target spec selections 624 may include currently detected options of services provided through moving targets that can be selected by a user at any time, such as delivery couriers. In another example, target spec selections 624 may include target spec selections available to the user at a current time based on the user's location or other criteria.

In one example, start selections 626 may include, but are not limited to, a start time, a range of start times, and start location or a range of start locations. In one example, a user may select a start time of "as soon as possible" or delay a start time until a later point in time. By setting a range of start times, a user may select to be alerted, via alert indicator 620, when a moving target is available during the range of times and receive a recommended time when the user needs to start traveling to intersect with the user. In addition, the user may set a start time that is dependent upon a transit schedule, such as setting a start time to a train schedule, where the departure time is not within the user's control.

In one example, user context selections 628 may include, but are not limited to, one or more additional time preferences, such as a time window for the user to intersect with the moving target, a location range for the intersect location from the current location based on distance, a maximum time to travel to the intersect location from a current location, a budget for transportation, a maximum wait time at an intersect location for the moving target to arrive, and a priority level for intersecting with the moving target. In addition, user context selections 628 may include, but are not limited to, one or more electronic calendar selections identifying when the user has time available to travel to intersect with the moving target, meetings scheduled for the user before and after traveling to intersect, and services requested by the user in the electronic calendar. In another example, user context selections 628 may also specify types of locations or ratings of locations that the user prefers for the intersect location with the moving target. In one example, user context selections 628 may indicate a preference to intersect with a moving target at a particular type of shop where meetings are more likely, such as a local shop, and also specify a preference for a threshold rating assigned to the type of shop by a social media service, such as a travel advisor service setting a rating for the local shop at a level of three stars or greater.

In one example, navigation interface 150 may also include, a selectable rating selection 630. In one example, in response to the user reaching the intersect location, the user may be prompted via rating selection 630 to select a rating for the intersect location selected. In one example, rating selection 630 may specify factors to guide a user in selecting a rating. In another example, rating selection 630 may prompt a user to provide separate ratings for separate type of factors, such as a factor for the ease with which the user was able to locate the moving target at the intersect location and the temperature of the intersect location or how difficult it was to intersect.

In one example, if a user selects one or more factors of an intersect request of user ID 622, target spec selections 624, start selections 626, and user context selections 628 and moving target service 110 indicates the intersect request is not feasible, alert indicator 620 may prompt the user to adjust one or more factors of the intersect request and may highlight one or more factors that the user may adjust to reach a feasible intersect request. For example, if the user selects a mode of transportation in user context selections 628 that is not feasible for the area to reach the moving target at any intersect points within a time frame specified in user context selections 628, alert indicator 620 may prompt the user with selectable options to adjust the mode of transportation or the time frame to a feasible intersect request, such as using a bus instead of a train.

Figure 7:
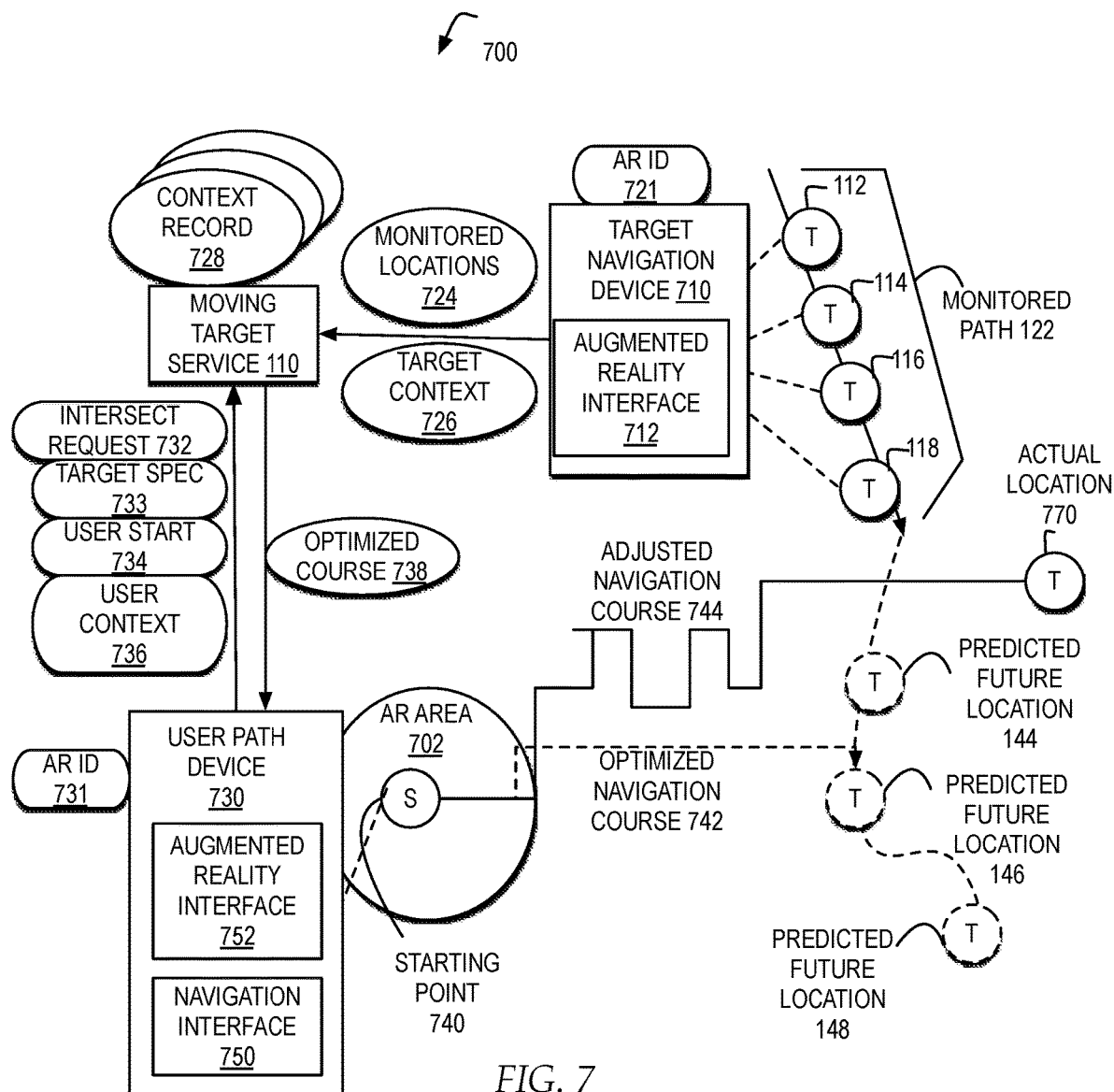
FIG. 7 illustrates one example of block diagram of a moving target navigation system for directing navigation of a user accessing an augmented reality service requesting to intersect with a moving target also accessing the augmented reality service, where both the user and the moving target may change courses in response to activity within the augmented reality service.

FIG. 7 illustrates a block diagram of a moving target navigation system for directing navigation of a user accessing an augmented reality service requesting to intersect with a moving target also accessing the augmented reality service, where both the user and the moving target may change courses in response to activity within the augmented reality service.

In one example, a moving target navigation service 700 may facilitate efficient intersections between multiple users of an augmented reality service, each identified by an augmented reality (AR) identifier. For example, a user carrying a user path device 730 may be identified by an AR identifier 731 and a user carrying a target navigation device 110 may be identified by an AR identifier 721. In one example, user path device 730 may access an augmented reality interface 752 for accessing an augmented reality environment provided by an augmented reality service and target navigation device 710 may access an augmented reality interface 712 for accessing an augmented reality environment provided by an augmented reality service.

In one example, an augmented reality service may represent a service that manages an augmented reality environment. In one example, an augmented reality environment may represent a digital environment that reflects an intersection between a virtual environment or virtual elements and a physical, real-world environment. In one example, an augmented reality environment may represent a live view of a physical, real-world environment with elements that are augmented by computer-generated or extracted real-world sensory input, such as, but not limited to, sound, video, graphics, haptics, or GPS data. In one example, an augmented reality environment may represent a virtual environment in which the virtual elements accessible to a user in the virtual environment are dependent upon a user's physical location in a real-world environment.

In one example, the user carrying user path device 730 may request to intersect with another user who is also accessing the augmented reality service from a different location. In one example, target spec 733 of intersect request 732 may specify AR ID 721, user start 734 may identify starting point 740, and user context 736 may identify that the users are accessing an augmented reality service and a preference to intersect, while also optimizing use of the augmented reality service along the route. In one example, an AR area 702 represents the span of the augmented reality service area surrounding the user's current location. In particular, within the augmented reality environment, the selection of virtual elements visible to the user in the augmented reality interface include those elements only provided to users who are physically present within AR area 702. The other user, AR ID 721, may view other selections of virtual targets within the augmented reality environment provided only to users who are physically present within the AR area around the other user's location.

In one example, target navigation device 710 may provide monitored locations 724 of the moving target and target context 726 indicating the moving target is accessing an augmented reality service via target navigation device 710. Moving target service 110 may analyze and collect context record 728, specifying historical information for routes when users are accessing the augmented reality service and specific characteristics of the augmented reality service that may impact future locations and routes of users accessing the service. In one example, moving target service 110 may include predicted future location 144, predicted future location 146, and predicted future location 148 in optimized course 738, provided to the user for directing the user to intersect with the other user, as the moving target.

In one example, optimized course 738 may yield an initial optimized navigation course 742 that is direct and intersects with predicted future location 146. In the example, as the user starts moving to intersect with the moving target, adjusted navigation course 744 illustrates the user's actual course and actual location 770 shows the other user's actual location when the user intersects with the other user, illustrated as moving target "T". In one example, user path device 730 may report the user's location to moving target service 110, or in another example, moving target service 110 may detect the user's location from the augmented reality service, which also monitor's the user's location. In one example, moving target service 110 may adjust optimized course 738 as the actual locations of each of the user and the moving target change.

In one example, moving target service 110 may apply a change threshold for determining when to adjust the navigation course suggested to the user to intersect with the moving target, such that moving target service 110 does not reanalyze and optimize the course each time the user or the moving target diverges slightly from a recommended or predicted course. In particular, when users are accessing an augmented reality service, as provided through the service, the user may change courses quickly in order to physically move to change the space covered by AR area 702, to access different selections of the virtual moving targets only available when the user is physically present at particular locations. For example, moving target service 110 may determine that if either the user or the moving target's actual path differs from the optimized or predicted paths by more than, for example, 0.5 miles, then moving target service 110 may update the optimized navigation course, to allow for both users to make minor adjustments to a path while optimizing interactions within the augmented reality service.

In one example, while augmented reality interface 752 and navigation interface 750 are illustrated as two components of user path device 730, navigation interface 750 may be integrated into augmented reality interface 752 or may represent a stand-alone interface. In addition, in one example, target navigation device 710 may also include a navigation interface integrated into augmented reality interface or as a stand-alone interface. In one example, moving target service 110 may alert the moving target that the user is attempting to intersect with the moving target. The augmented reality service, through augmented reality interface 712 and augmented reality interface 752, may include current location information for both the user and the moving target and may show each of the user and moving target the relative location of the other.

Figure 8:
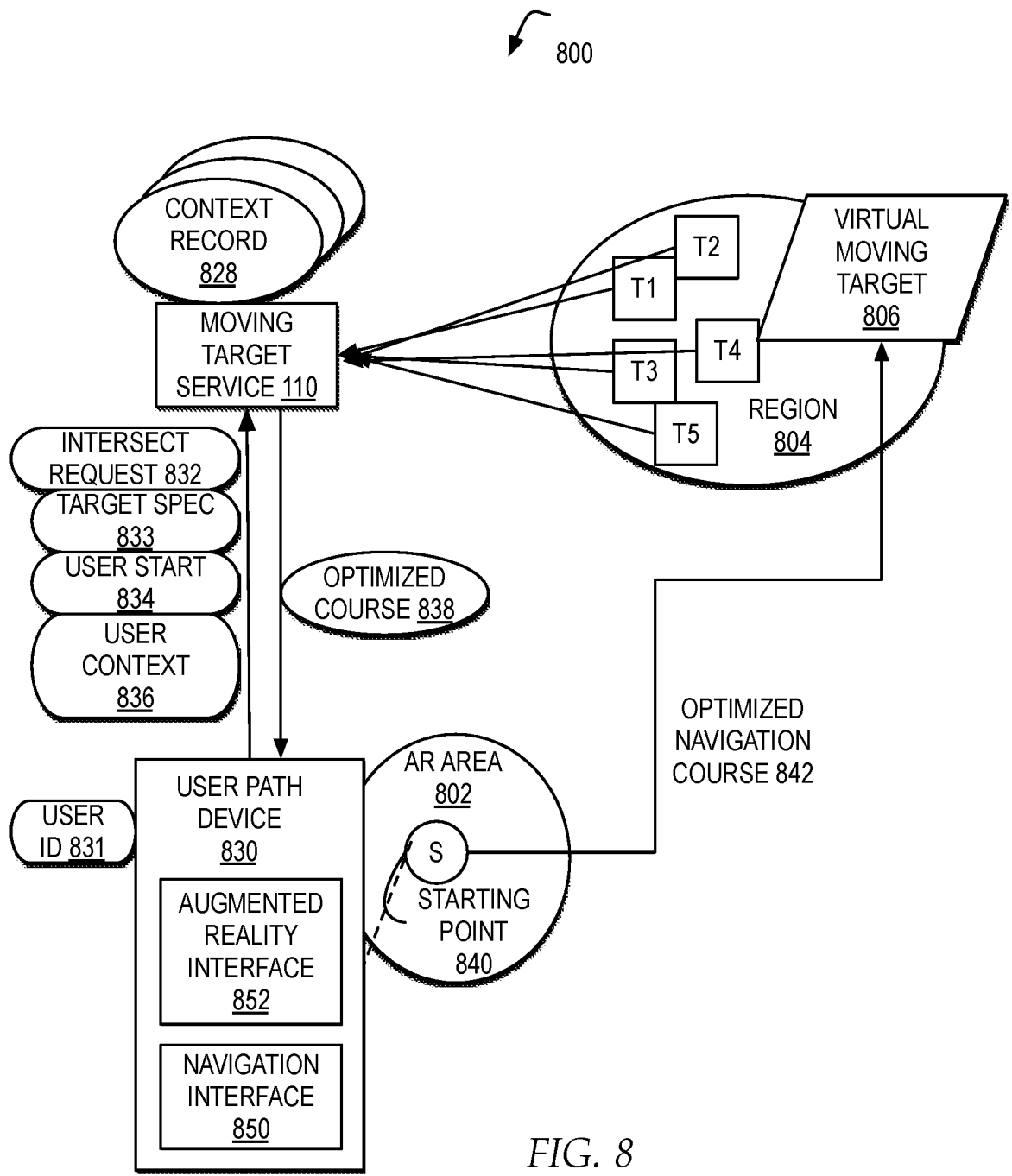
FIG. 8 illustrates one example of a block diagram of a moving target navigation system for directing navigation of a user accessing an augmented reality service requesting to intersect with a density of other moving targets accessing the augmented reality service to potentially access a virtual moving target.

FIG. 8 illustrates a block diagram of a moving target navigation system for directing navigation of a user accessing an augmented reality service requesting to intersect with a density of other moving targets accessing the augmented reality service to potentially access a virtual moving target.

In one example, a moving target navigation service 800 may facilitate efficient intersection of a user of an augmented reality service, with other users of the augmented reality service, based on the density of other users in a particular physical region. In one example, when the density of users in a physical region reaches a threshold, the density of users may indicate that the users are accessing a feature of the augmented reality service that the requesting user would like to intersect with. In one example, FIG. 8 illustrates multiple users, represented by "T1", "T2", "T3", "T4", and "T5", each accessing an augmented reality service through separate target navigation devices each with an augmented reality interface, such as target navigation device 710 with augmented reality interface 712. In one example, the target navigation device carried by each of the users sends monitored locations and target context to moving target service 110. The target context may indicate a particular virtual moving target 806 accessed by each of the users. In one example, an augmented reality service may provide virtual moving targets that move throughout an augmented reality environment and are only visible within the augmented reality interface of user's position in a particular area during a particular time, before moving or disappearing.

In one example, moving target service 110 receives the monitored locations of "T1", "T2", "T3", "T4", and "T5", generates context record 828 with any indicators of the virtual moving targets in target context, information collected about the augmented reality service, and any user context 836 received in an intersect request 832. In one example, a user identified by user ID 831 may access the augmented reality service through an augmented reality interface 852 of a user path device 830, which also includes a navigation interface for guiding the user to intersect with moving targets. In one example, intersect request 832 may include a target spec 833 identifying a request to intersect with a density of users of the augmented reality of service within a particular region and a user start 834 of starting point 840, or the user's current point when the density of users is identified.

In one example, moving target service 110 may monitor for densities of users of the augmented reality service within a region of a size identified by region 804, and identify the users "T1", "T2", "T3", "T4", and "T5" meeting the density threshold. In one example, moving target service 110 may generate optimized course 838 identifying a predicted location that the user needs to be physically present at for AR area 802 to include virtual moving target 806. In addition, optimized course 838 may identify a particular route, illustrated by optimized navigation course 842, that is predicted to include a higher probability of the user intersecting with additional virtual moving targets in augmented reality interface 852 based on information collected about the augmented reality service in context record 828.

Figure 9:
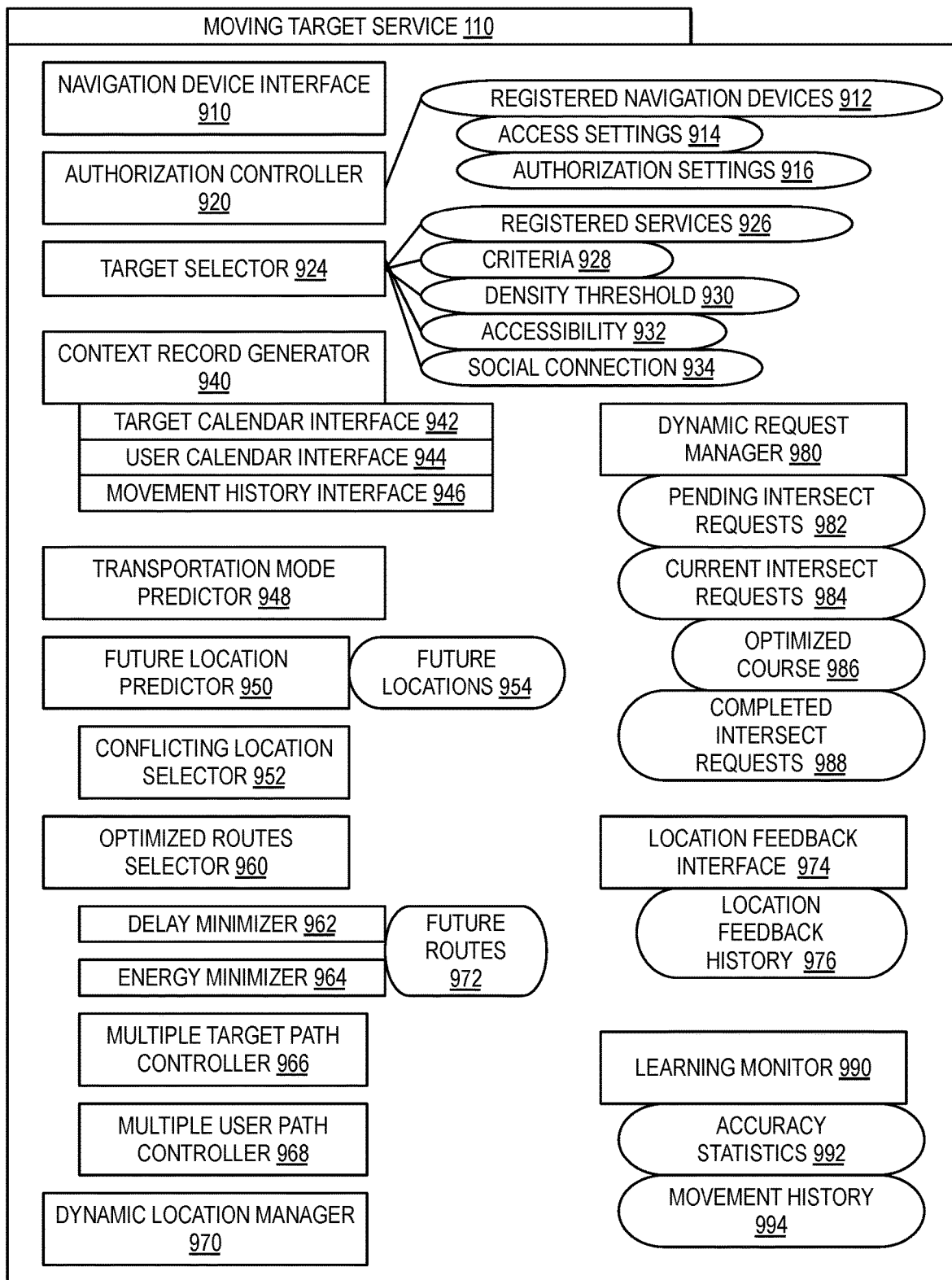
FIG. 9 illustrates one example of block diagram of one example of one or more components of a moving target service of a moving target navigation system.

FIG. 9 illustrates a block diagram of one example of one or more components of a moving target service of a moving target navigation system.

In one example, moving target service 110 may implement a navigation device interface 910. In one example, navigation device interface 910 may interface with one or more target navigation devices, such as target navigation device 120, or services that receive and distribute monitored location data from target navigation device 120. In one example, navigation device interface 910 may interface with multiple navigation devices, each specified in registered navigation devices 912. In one example, navigation device interface 910 may manage pushing or pulling monitored locations from a navigation device specified in registered navigation devices 912 according to access settings 914 specified with each registered navigation device in registered navigation devices 912.

In addition, in one example, an authorization controller 920 of moving target service 110 may control whether a particular user requesting to intersect with a moving target associated with a navigation device is authorized to access the location of the moving target at a current time. In one example, authorization settings 916, specified with each device in registered navigation devices 912, may specify the authorization requirements for accessing the location of a moving target associated with the device by user identifier, day, time period, and radius. For example, authorization settings 916 may specify particular user identifiers and groups of user identifiers with authorization to access the location of a particular moving target during a particular time period and for a selection of locations of the moving target within a selected radius of locations. In addition, authorization settings 916 may specify fee requirements or other criteria associated with authorization to access the location of a particular moving target. In one example, the selected radius of locations may specify particular ranges of locations or regions of locations or may specify a particular distance from the current location of a moving target. For example, if a tour guide offers a service where users may intersect with a walking tour of a city during a particular time period, within a particular range of locations on the walking tour, the tour guide, as the moving target, may specify that users who have pre-paid for a tour may view the locations of the tour guide during certain time periods and those locations within a selection radius of locations. In another example, a person who is a moving target may select to only share the user's current location within a mile radius of the user's primary work location on a given day. In one example, by authorization controller 920 determining whether a user requesting access to a moving target associated with a device is authorized to access the location of a moving target, authorization controller 920 may also protect and restrict access to the location of the moving target and only allow access to a selection of users of moving target service 110. Authorization controller 920 also protects and restrict access to the location of the moving target for specific time periods and for specific ranges of locations within a selected radius.

In one example, in identifying a moving target, moving target service 110 may include a target selector 924 to aid a user in selecting one or more moving targets. In one example, while a user may specify a particular moving target by a particular identifier of an entity that may log onto target navigation device 120, in another example, a user may select a service or specify other preferences for use by moving target service 110 in selecting one or more moving targets. In one example, registered services 926 may specify one or more entity identifiers or navigation device identifiers associated with moving targets that provide a particular service. In one example, if a user requests a particular service without identifying a particular entity or navigation device, target selector 924 may first determine a selection of navigation devices associated with entities that provide the particular service as identified in registered service 926 and select one or more moving targets from among the selection of navigation devices. In addition, in the example, criteria 928 may specify entity identifiers for one or more moving targets or registered services that meet particular criteria, from which target selector 924 may select according to preferences set by a user.

In one example, registered services 926 may include entity IDs of services that send service availability indicators to moving target service 110, with a type of service, a time window when the service is available, and other restrictions. When a service is included in registered services 926, target selector 924 may select to monitor for and record a current location in association with each entity ID from each target navigation device logged onto with a registered entity ID, during the time window specified for the service. In one example, by monitoring the current location of moving targets associated with registered services, target selector 924 may more efficiently filter through available registered services to select one or more moving targets providing a type of service requested by a user.

Target selector 924 may apply one or more density thresholds 930 to the moving targets available in a particular area, further specified by moving targets associated with registered services 926 or other entity IDs detected in the area, to monitor densities of moving targets using a particular service or meeting some other criteria. For example, target selector 924 may apply one or more density thresholds 930 to identify a number of moving targets accessing a particular augmented reality service, where the moving targets are physically present within range of a particular location and engaging in an augmented reality service through a portable communication device, which may include the target navigation device. In another example, target selector 924 may apply one or more density thresholds 930 to all the moving targets detected within a particular area to identify whether a current density of moving targets in a particular area exceeds a threshold that would make it difficult for the user to find the moving target in the crowd or whether the current density of moving targets in a particular area is below a threshold that would make it less likely that an augmented reality application may provide a particular experience at the location. In another example, a user may select, in user context 136, a preference to intersect with moving targets based on whether a particular density of the moving targets in an area exhibit a similar cognitive characteristic, where density thresholds 930 identify a number of moving targets in a particular area detected as exhibiting a particular cognitive characteristic. In another example, whether or not a user indicates a preference to intersect with moving targets based on whether a particular density of the moving targets in an area exhibit a similar cognitive characteristic, moving target service 110 may automatically select to filter locations with moving targets reaching a particular density based on a cognitive characteristic that is determined as helpful for the user based on cognitive aspects of the user.

In one example, target selector 924 may access one or more accessibility characteristic when selecting a moving target from accessibility 932. Accessibility may include, but is not limited to, physical accessibility characteristics of a moving target and cognitive accessibility characteristics of a moving target. In one example, if a moving target is a train or is a person riding a train, accessibility 932 may indicate any accessibility options for accessing the train such as wheelchair access.

In one example, target selector 924 may filter moving target selections according to social connection 934 of the user. For example, a user may provide target selector 924 with access to the user's social media connections, which may include representations or profiles of individuals and businesses that a user has interacted with online and which the user has selected to establish an online connection with, including businesses that a user has rated online. In one example a user's social media connections may also include connections to virtual users or virtual representations of users. In one example, target selector 924 may filter through a group of target selections and identify one or more that are either within a user's connection circles in a social media service or are connections of connections of a user through a social media service. In another example, target selector 924 may filter through a group of target selections to identify one or more that are identifiers of businesses that a user has rated highly in an online forum. In another example, target selector 924 may select a location range to search for moving targets within in order to increase the probability that a user will intersect with a moving target that is also within the user's social connections. Further, a user may select, in an intersect request, to calculate a course to a direction in which a density of people the user knows is above a particular threshold, where target selector 924 may apply density threshold 930 and social connection 934 to identify an area where the density of moving targets includes a particular density of people who are also identified in social connection 934.

Moving target service 110 may also implement a context record generator 940. In one example, context record generator 940 manages generation of context record 128 for an intersect request. In one example, context record generator 940 may collect any context records received from target navigation device 120 and user path device 130, such as target context 126 and user context 436. In addition, context record generator 940 may implement a target calendar interface 942 for interfacing with one or more electronic calendar and event services for the user to access electronic calendar events and other information that provides context for a future speed of travel and future locations of the target. In one example, a future speed of travel may be impacted by a predicted mode of transportation. In addition, context record generator 940 may implement a user calendar interface 944 for interfacing with one or more electronic calendar and event services for the user to access electronic calendar events and other information that provides context for the speed of travel and schedule availability of the user. Further, context record generator 940 may implement a movement history interface 946 that accesses records of a history of movement of one or more of the target and the user. In one example, as target and user movement is detected in the present, context record generator 940 may also push the detected movement to movement history interface 946 for storage in association with an entity ID of a target or a user ID of a user.

In one example, moving target service 110 may implement a transportation mode predictor 948 that analyzes and identifies transportation modes of the target or the user. In one example, if target context 126 does not identify a transportation mode used by the moving target, then transportation mode predictor 948 may monitor the route, speed of travel and other characteristics of monitored locations 124 to predict a transportation mode used by the moving target. In another example, if user context 436 does not identify a transportation mode requested by or available to the user, then transportation mode predictor 948 may evaluate other information provided in an intersect request, the user's history of transportation modes accessed via movement history interface 946, and other information about accessible transportation modes in an area, to predict one or more transportation modes that may be used by a user.

In one example, moving target service 110 may implement a future location predictor 950 to predict one or more future locations of a moving target, as future locations 954. In one example, future location predictor 950 collects monitored locations 124 and context record 128, identifies one or more locations of monitored path 122 from monitored locations 124, and predicts one or more future locations of the moving target from the one or more locations of monitored path 122 and context record 128 for a time period. In one example, future location predictor 950 may implement a conflicting location selector 952 that detects conflicts between one or more locations of monitored path 122 and one or more records within context record 128, selects a location or record with a higher probability of reflecting a predicted path of future locations of the moving target, and providing the probability associated with the future locations. For example, if context record 128 includes an event scheduled in an electronic calendar starting within 5 minutes, but a current direction of travel and location of the moving target indicate the moving target is moving away from the location of the scheduled event, conflicting location selector 952 may select that the actual direction of travel indicated by monitored path 122 has a higher probability of continuing in the future than the probability of the moving target changing course to the location of the scheduled event.

In one example, moving target service 110 may implement an optimized routes selector 960 for selecting one or more optimized routes for a user to intersect with a moving target, as future routes 972. In one example, if moving target service 110 does not receive a starting location for the user, moving target service 110 may predict a start location for the user based on context record 128 or recommend a start location for the user. In one example, optimized routes selector 960 may include a delay minimizer 962 which may calculate a delay factor for each route from the user start location or a range of start locations to one of more locations in future locations 954, for one or more modes of transportation, and determine one or more predicted future locations in future locations 954 with routes that minimize delay. In one example, optimized routes selector 960 may include an energy minimizer 964 which may calculate an energy factor for each route from the user start location or a range of start locations to one of more locations in future locations 954, for one or more modes of transportation, and determine one or more predicted future locations in future locations 954 with routes that minimize the energy required for the user to intersect with the moving target. In the example, optimized routes selector 960 may specify the one or more predicted locations and selection of routes that minimize delay and minimize the energy and minimizing the cost required for the user to intersect with the moving target in future routes 972.

In addition, optimized routes selector 960 may perform additional optimization analysis on routes selected in future routes 972 to specify routes according to cognitive preferences of the user, such as a cognitive preference to take routes that are associated with a particular emotion. In one example, optimized routes selector 960 may detect a current cognitive state of a user from an intersect request and optimized routes selector 960 may forecast a cognitive state of a user from an intersect request, context record 128, and location feedback history 976 by one or more types of feedback recorded, such as by user, by location, or by route.

In addition, optimized routes selector 960 may perform additional optimization analysis on routes selected in future routes 972 if multiple targets or multiple users are included in an intersect request. For example, if an intersect request includes multiple moving targets during a particular period of time, multiple target path controller 966 may further optimize the selection of the one or more predicted locations and selection of routes to minimize delay and minimize energy and cost for the user to intersect with multiple moving targets at one or more locations during the particular time period. In another example, if an intersect request includes multiple users and a time period during which the multiple users need to intersect with a same moving target at a same location, multiple user path controller 968 may further optimize the selection of the one or more predicted locations and selection of routes to minimize delay and minimize energy for the multiple users to intersect with the moving target at the same location during the particular time period.

In one example, future location predictor 950 and optimized routes selector 960 may implement one or more types of path finding algorithms to predict and identify a shortest optimal path from a starting point to a destination point, where the destination point is moving. In one example, path finding algorithms may be based on one or more types of methods including, but not limited to, grid based path finding algorithms, evolutionary algorithms, and curve based algorithms.

In one example, as a user or moving target reach an intersect location, the user or moving target may provide feedback to moving target service 110 regarding a selected intersect location. In one example, location feedback interface 974 may receive feedback from a user or moving target and store the feedback in location feedback history 976. In one example, feedback may include indicators of whether the intersect actually occurred between the user and the moving target, indicators of the feasibility of the intersect location for the user to intersect with the moving target, accessibility issues with the intersect location, and ratings of the intersect location. In addition, one or more of target navigation device 120 and user path device 130 may include an input interface for collecting cognitive information about the cognitive experience of the moving target or the user at the intersect location, which may be received by location feedback interface 974. In one example, location feedback interface 974 may analyze and classify cognitive information by scoring one or more types of cognitive experiences detected from the collected cognitive information. In addition, location feedback interface 974 may catalog cognitive experiences in location feedback history 976 for sorting by location, cognitive experience, user ID, entity ID, and other criteria for access by movement history interface 946 when generating a context record.

In one example, in response to an intersect request or in response to another trigger, moving target service 110 may include a dynamic request manager 980 that manages pending and current intersect requests. In one example, dynamic request manager 980 may initially mark incoming intersect requests as pending intersect requests 982. In one example, once moving target service 110 sends an optimized course 986 to a user path device and the user begins navigation using optimized course 986, dynamic request manager 980 may mark the intersect request as current intersect requests 984. In one example, dynamic request manager 980 may monitor the completion status of optimized courses marked as current intersect requests and, upon completion of an optimized course, mark the intersect request under completed intersect requests 988, which may be catalogued and accessible to movement history interface 946 in generating context records for future intersect requests.

In one example, for intersect requests marked as pending intersect requests 982, dynamic request manager 980 may continue to manage whether one or more conditions set in the intersect requests have occurred or changed, which would allow for generating optimized course 986 for the intersect request. For example, if an intersect request requires target selector 924 to dynamically select the moving target for the intersect request and target selector 924 is monitoring monitored locations reported by target navigation devices over a period of time to select a moving target, dynamic request manager 980 may manage the intersect request as a pending intersect request requiring monitoring.

In one example, for intersect requests marked as current intersect requests 984, where optimized course 986 has been sent to a user path device and the user has started navigation on optimized course 986, dynamic request manager 980 may trigger a dynamic location manager 970 to continue monitoring the location of the moving target identified in future locations 954 for optimize course 986, and, if available in optimized course 986, continue monitoring the route and conditions in future routes 972. In one example, as dynamic location manager 970 detects changes to future locations 954 and future routes 972 in optimized course 986, dynamic location manager 970 may dynamically adjust predicted locations in future locations 954, dynamically adjust routes in future routes 972, and may send an updated optimized course 986, reflecting the dynamic adjustments, to the user path device.

In one example, as dynamic request manager 980 detects that an optimized course marked in current intersect requests 984 is completed, such as from the time window for the intersect request expiring, a user device indicating the intersect request is complete or canceled, or other inputs indicating an intersect request is no longer open, dynamic request manager 980 may add the intersect request and the optimized course to completed intersect requests 988, with additional tagging to indicate the status of the intersect at completion. For example, status tagging may include, but is not limited to, intersect successful, intersect not successful, request canceled, and request not feasible due to changes in conditions.

In one example, moving target service 110 includes a learning monitor 990 that monitors changes by dynamic location manager 970 and completed intersect requests 988 and analyzes the changes and completed intersect requests to determine the accuracy of predicted future locations, predicted times of intersection, and predicted future routes in comparison with the actual locations of moving targets and routes taken by users to intersect with moving targets. Learning monitor 990 may collect statistics regarding the accuracy of predicted future locations and predicted future routes in accuracy statistics 992. In one example, in predicting future locations for future intersect requests, future location predictor 950 and optimized route selector 960 may apply accuracy statistics 992 in calculating a percentage predicted accuracy of predicted future locations and predicted future routes. In addition, learning monitor 990, based on accuracy statistics 992, may dynamically adjust criteria and weights applied by future location predictor 950 in selecting future locations 954 and optimized routes selector 960 in selecting future routes 972.

In addition, learning monitoring 990 may monitor the results of each intersect request and optimized course, with feedback provided, and collect the results and feedback in movement history 994. In one example, movement history interface 946 may access movement history 994 in identifying context for future intersect requests. In one example, movement history 994 may reflect information learned by learning monitor 990 about which routes were marked as successful for particular types of movements and particular types of calendar entries. In another example, movement history 994 may reflect information learned by learning monitor 990 about which moving targets travel more quickly than the typical travel rate for moving targets using a particular type of transportation. In another example, movement history 994 may include information learned by learning monitor 990 about the paths that a moving target tends to take when the moving target is an animal, and how the paths are impacted by weather, feeding time, time of day, and other factors.

Figure 10:
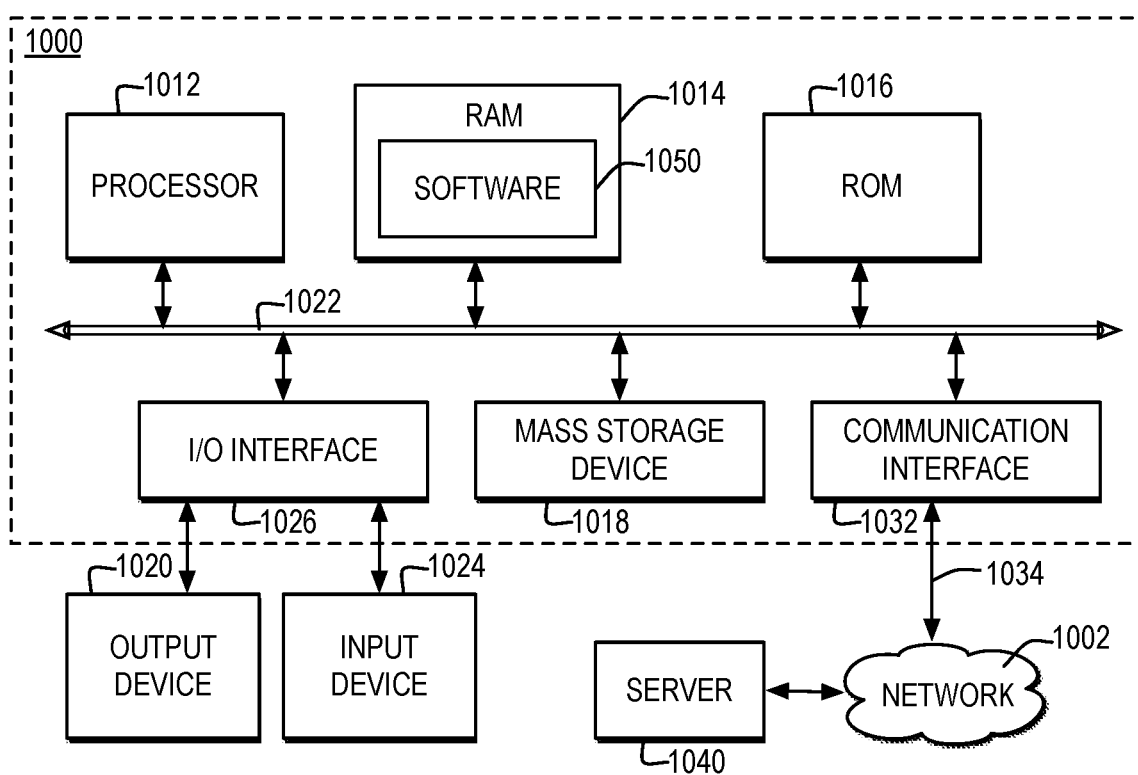
FIG. 10 illustrates one example of a block diagram of one example of a computer system in which one embodiment of the invention may be implemented.

FIG. 10 illustrates a block diagram of one example of a computer system in which one embodiment of the invention may be implemented. The present invention may be performed in a variety of systems and combinations of systems, made up of functional components, such as the functional components described with reference to a computer system 1000 and may be communicatively connected to a network, such as network 1002.

Computer system 1000 includes a bus 1022 or other communication device for communicating information within computer system 1000, and at least one hardware processing device, such as processor 1012, coupled to bus 1022 for processing information. Bus 1022 preferably includes low-latency and higher latency paths that are connected by bridges and adapters and controlled within computer system 1000 by multiple bus controllers. When implemented as a server or node, computer system 1000 may include multiple processors designed to improve network servicing power.

Processor 1012 may be at least one general-purpose processor that, during normal operation, processes data under the control of software 1050, which may include at least one of application software, an operating system, middleware, and other code and computer executable programs accessible from a dynamic storage device such as random access memory (RAM) 1014, a static storage device such as Read Only Memory (ROM) 1016, a data storage device, such as mass storage device 1018, or other data storage medium. Software 1050 may include, but is not limited to, code, applications, protocols, interfaces, and processes for controlling one or more systems within a network including, but not limited to, an adapter, a switch, a server, a cluster system, and a grid environment.

Computer system 1000 may communicate with a remote computer, such as server 1040, or a remote client. In one example, server 1040 may be connected to computer system 1000 through any type of network, such as network 1002, through a communication interface, such as network interface 1032, or over a network link that may be connected, for example, to network 1002.

In the example, multiple systems within a network environment may be communicatively connected via network 1002, which is the medium used to provide communications links between various devices and computer systems communicatively connected. Network 1002 may include permanent connections such as wire or fiber optics cables and temporary connections made through telephone connections and wireless transmission connections, for example, and may include routers, switches, gateways and other hardware to enable a communication channel between the systems connected via network 1002. Network 1002 may represent one or more of packet-switching based networks, telephony based networks, broadcast television networks, local area and wire area networks, public networks, and restricted networks.

Network 1002 and the systems communicatively connected to computer 1000 via network 1002 may implement one or more layers of one or more types of network protocol stacks which may include one or more of a physical layer, a link layer, a network layer, a transport layer, a presentation layer, and an application layer. For example, network 1002 may implement one or more of the Transmission Control Protocol/Internet Protocol (TCP/IP) protocol stack or an Open Systems Interconnection (OSI) protocol stack. In addition, for example, network 1002 may represent the worldwide collection of networks and gateways that use the TCP/IP suite of protocols to communicate with one another. Network 1002 may implement a secure HTTP protocol layer or other security protocol for securing communications between systems.

In the example, network interface 1032 includes an adapter 1034 for connecting computer system 1000 to network 1002 through a link and for communicatively connecting computer system 1000 to server 1040 or other computing systems via network 1002. Although not depicted, network interface 1032 may include additional software, such as device drivers, additional hardware and other controllers that enable communication. When implemented as a server, computer system 1000 may include multiple communication interfaces accessible via multiple peripheral component interconnect (PCI) bus bridges connected to an input/output controller, for example. In this manner, computer system 1000 allows connections to multiple clients via multiple separate ports and each port may also support multiple connections to multiple clients.

In one embodiment, the operations performed by processor 1012 may control the operations of flowchart of FIGS. 11-17 and other operations described herein. Operations performed by processor 1012 may be requested by software 1050 or other code or the steps of one embodiment of the invention might be performed by specific hardware components that contain hardwired logic for performing the steps, or by any combination of programmed computer components and custom hardware components. In one embodiment, one or more components of computer system 1000, or other components, which may be integrated into one or more components of computer system 1000, may contain hardwired logic for performing the operations of flowcharts in FIGS. 11-17.

In addition, computer system 1000 may include multiple peripheral components that facilitate input and output. These peripheral components are connected to multiple controllers, adapters, and expansion slots, such as input/output (I/O) interface 1026, coupled to one of the multiple levels of bus 1022. For example, input device 1024 may include, for example, a microphone, a video capture device, an image scanning system, a keyboard, a mouse, or other input peripheral device, communicatively enabled on bus 1022 via I/O interface 1026 controlling inputs. In addition, for example, output device 1020 communicatively enabled on bus 1022 via I/O interface 1026 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 10, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 10 may vary. Furthermore, those of ordinary skill in the art will appreciate that the depicted example is not meant to imply architectural limitations with respect to the present invention.

Figure 11:
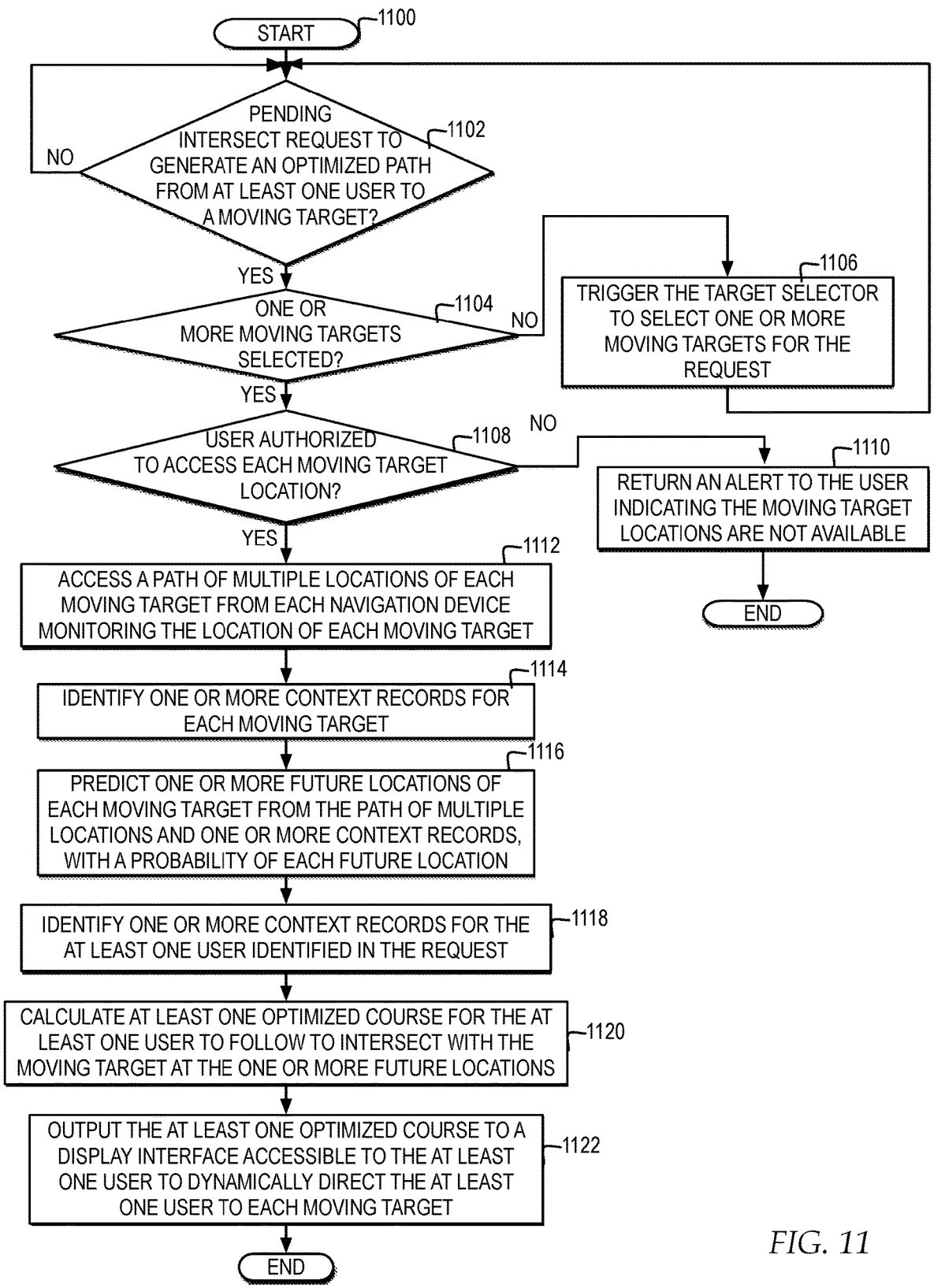
FIG. 11 illustrates one example of a high-level logic flowchart of a process and computer program for directing navigation of a user to intersect with a moving target.

FIG. 11 illustrates a high-level logic flowchart of a process and computer program for directing navigation of a user to intersect with a moving target.

In one example, the process and computer program start at block 1100 and thereafter proceeds to block 1102. Block 1102 illustrates a determination whether an intersect request to generate an optimized path from at least one user to a moving target is pending. At block 1102, if an intersect request to generate an optimized path is pending, then the process passes to block 1104. Block 1104 illustrates a determination whether one or more moving targets have been identified for the pending request. At block 1104, if one or more moving targets have not been identified for the pending request, then the process passes to block 1106. Block 1106 illustrates triggering the target selector to select one or more moving targets for the request, and the process returns to block 1102.

At block 1104, if one or more moving targets have been identified for the pending request, then the process passes to block 1108. Block 1108 illustrates a determination whether a user is authorized to access each moving target location. At block 1108, if a user is not authorized to access each moving target location, then the process passes to block 1110. Block 1110 illustrates returning an alert to a user indicating that each moving target locations are not available, and the process ends.

Returning to block 1108, if a user is authorized to access each moving target location, then the process passes to block 1112. Block 1112 illustrates accessing a path of multiple locations of each moving target from each navigation device monitoring the location of each moving target. Next, block 1114 illustrates identifying one or more context records for each moving target. Thereafter, block 1116 illustrates predicting one or more future locations of each moving target from the path of multiple locations and one or more context records, with a probability of each future location. Next, block 1118 illustrates identifying one or more context records for the at least one user identified in the request.

Thereafter, block 1120 illustrates calculating at least one optimized course for the at least one user to follow to intersect with the moving target at the one or more future locations. Next, block 1122 illustrates outputting the at least one optimized course to a display interface accessible to the at least one user to dynamically direct the at least one user to each moving target.

Figures 12, 13:
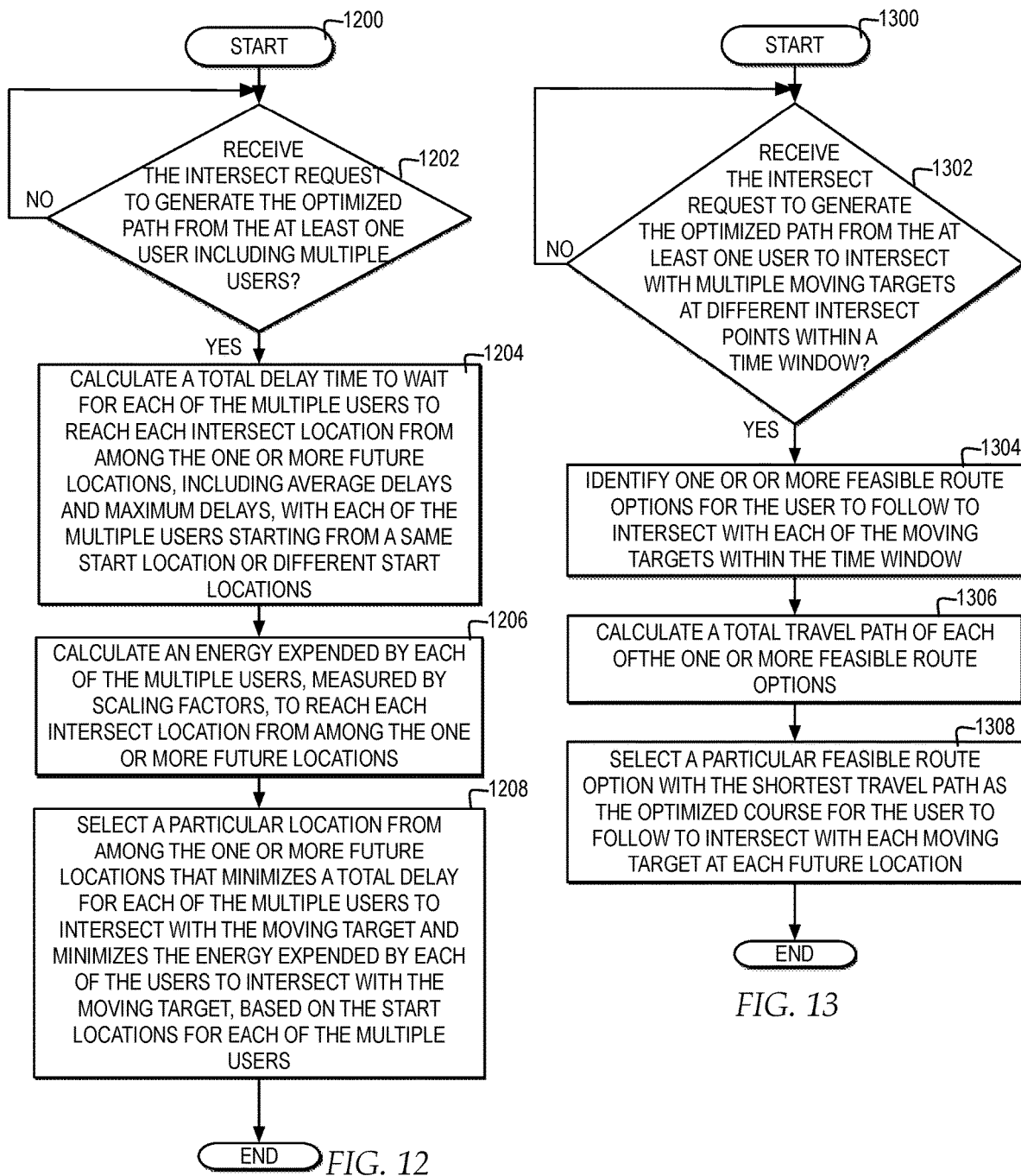
FIG. 12 illustrates one example of a high-level logic flowchart of a process and computer program for directing navigation of multiple users to intersect with a same moving target at a same location, minimizing the total delay of each user and the energy expended by both users and the moving target.
FIG. 13 illustrates one example of a high-level logic flowchart of a process and computer program for directing navigation of at least one user to intersect with multiple moving targets during a time window, minimizing a total travel path.

FIG. 12 illustrates a high-level logic flowchart of a process and computer program for directing navigation of multiple users to intersect with a same moving target at a same location, minimizing the total delay of each user and the energy expended by both users and the moving target.

In one example, the process and computer program start at block 1200 and thereafter proceeds to block 1202. Block 1202 illustrates a determination whether an intersect request to generate the optimized path from the at least one user includes multiple users. At block 1202, if an intersect request to generate the optimized path from the at least one user includes multiple users, then the process passes to block 1204. Block 1204 illustrates calculating a total delay time to wait for each of the multiple users to reach each intersect location from among the one or more future locations, including average delays and maximum delays, with each of the multiple users starting from a same start location or different start locations. Next, block 1206 illustrates calculating an energy expended by each of the multiple users, measured by scaling factors, to reach each intersect location from among the one or more future locations. Thereafter, block 1208 illustrates selecting a particular location from among the one or more future locations that minimizes a total delay for each of the multiple users to intersect with the moving target and minimizes the energy expended by each of the users to intersect with the moving target, based on the start locations for each of the users, and the process ends.

FIG. 13 illustrates a high-level logic flowchart of a process and computer program for directing navigation of at least one user to intersect with multiple moving targets during a time window, minimizing a total travel path.

In one example, the process and computer program start at block 1300 and thereafter proceeds to block 1302. Block 1302 illustrates a determination whether the received intersect request includes a request to generate the optimized path from the at least one user to intersect with multiple moving targets at different intersect points within a time window. At block 1302, if the intersect request includes a request to generate the optimized path from the at least one user to intersect with multiple moving targets at different intersect points within a time window, then the process passes to block 1304. Block 1304 illustrates identifying one or more feasible route options for the user to follow to intersect with each of the moving targets within the time window. Next, block 1306 illustrates calculating a total travel path of each of the one or more feasible route options. Thereafter, block 1308 illustrates selecting a particular feasible route option with the shortest travel path as the optimized course for the user to follow to intersect with each moving target at each future location, and the process ends.

Figure 14:
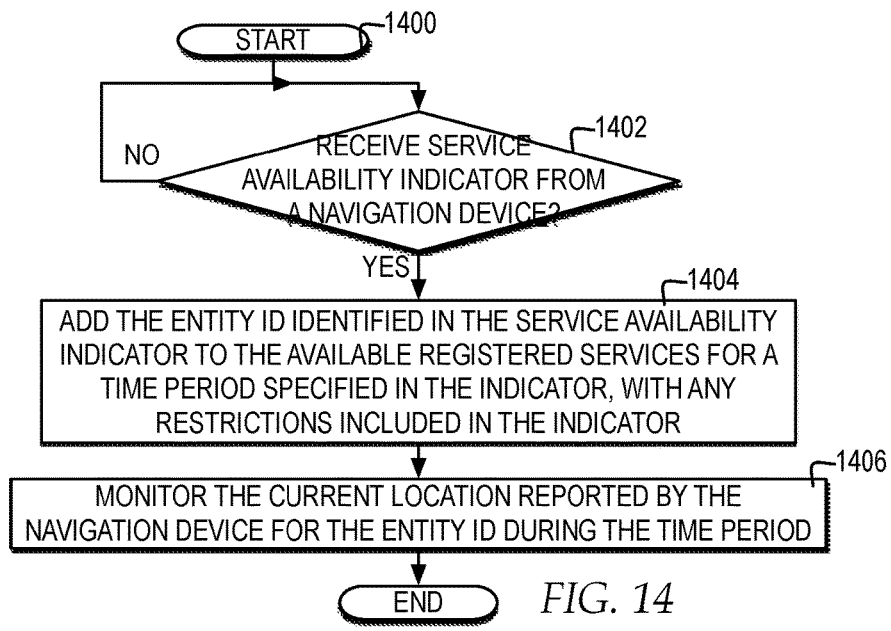
FIG. 14 illustrates a high-level logic flowchart of a process and computer program for managing registered services and monitoring for current locations of registered services.

FIG. 14 illustrates a high-level logic flowchart of a process and computer program for managing registered services and monitoring for current locations of registered services.

In one example, the process and computer program start at block 1400 and thereafter proceeds to block 1402. Block 1402 illustrates a determination whether a service availability indicator is received from a navigation device. At block 1402, if a service availability indicator is received from a navigation device, then the process passes to block 1404.

Block 1404 illustrates adding the entity ID identified in the service availability indicator to the available registered services for a time period specified in the indicator, with any restrictions included in the indicator. Next, block 1046 illustrates monitoring the current location reported by the navigation device for the entity ID during the time period, and the process ends.

Figure 15:
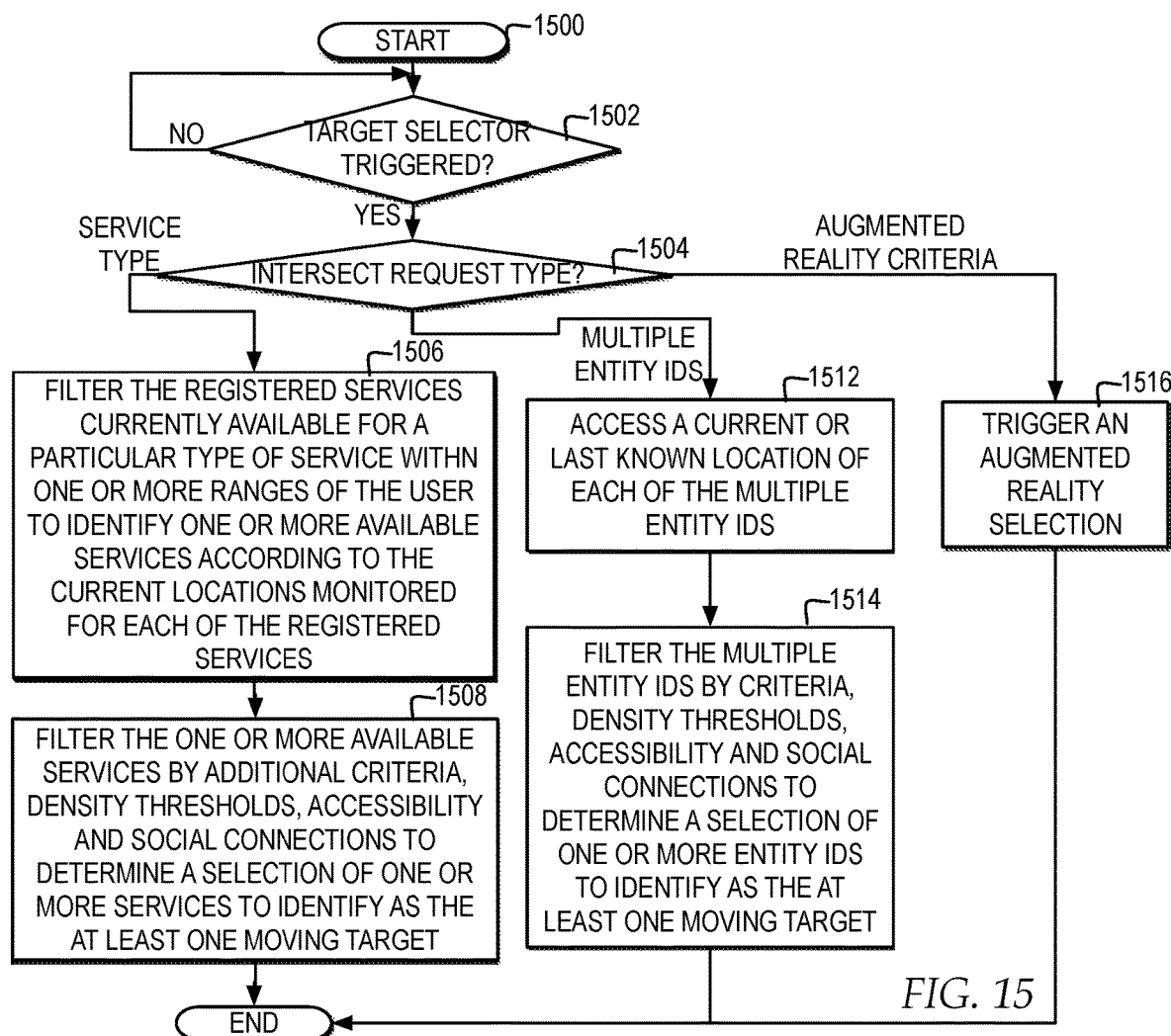
FIG. 15 illustrates a high-level logic flowchart of a process and computer program for selecting one or more moving targets.

FIG. 15 illustrates a high-level logic flowchart of a process and computer program for selecting one or more moving targets.

In one example, the process and computer program start at block 1500 and thereafter proceeds to block 1502. Block 1502 illustrates a determination whether a target selector is triggered. At block 1502, if a target selector is triggered, then the process passes to block 1504. Block 1504 illustrates a determination of a type of service requested.

At block 1504, if a user requests a particular service type, then the process passes to block 1506. Block 1506 illustrates filtering the registered services currently available for a particular type of service within one or more ranges of the user to identify one or more available services according to the current locations monitored for each of the registered services. Next, block 1508 illustrates filtering the one or more available services by additional criteria, density thresholds, accessibility, and social connections to determine a selection of one or more services to identify as the at least one moving target.

Returning to block 1504, if a user requests a selection from among multiple entity IDs or a group of entity IDs, then the process passes to block 1512. Block 1512 illustrates accessing a current last known location of each of the multiple entity IDs. Next, block 1514 illustrates filtering the multiple entity IDs by criteria, density thresholds, accessibility, and social connections to determine a selection of one or more entity IDs to identify as the at least one moving target, and the process ends.

Returning to block 1504, if a user requests a selection of a moving type based on other criteria, then the process passes to block 1516. Block 1516 illustrates triggering an augmented reality selection, and the process ends.

Figure 16:
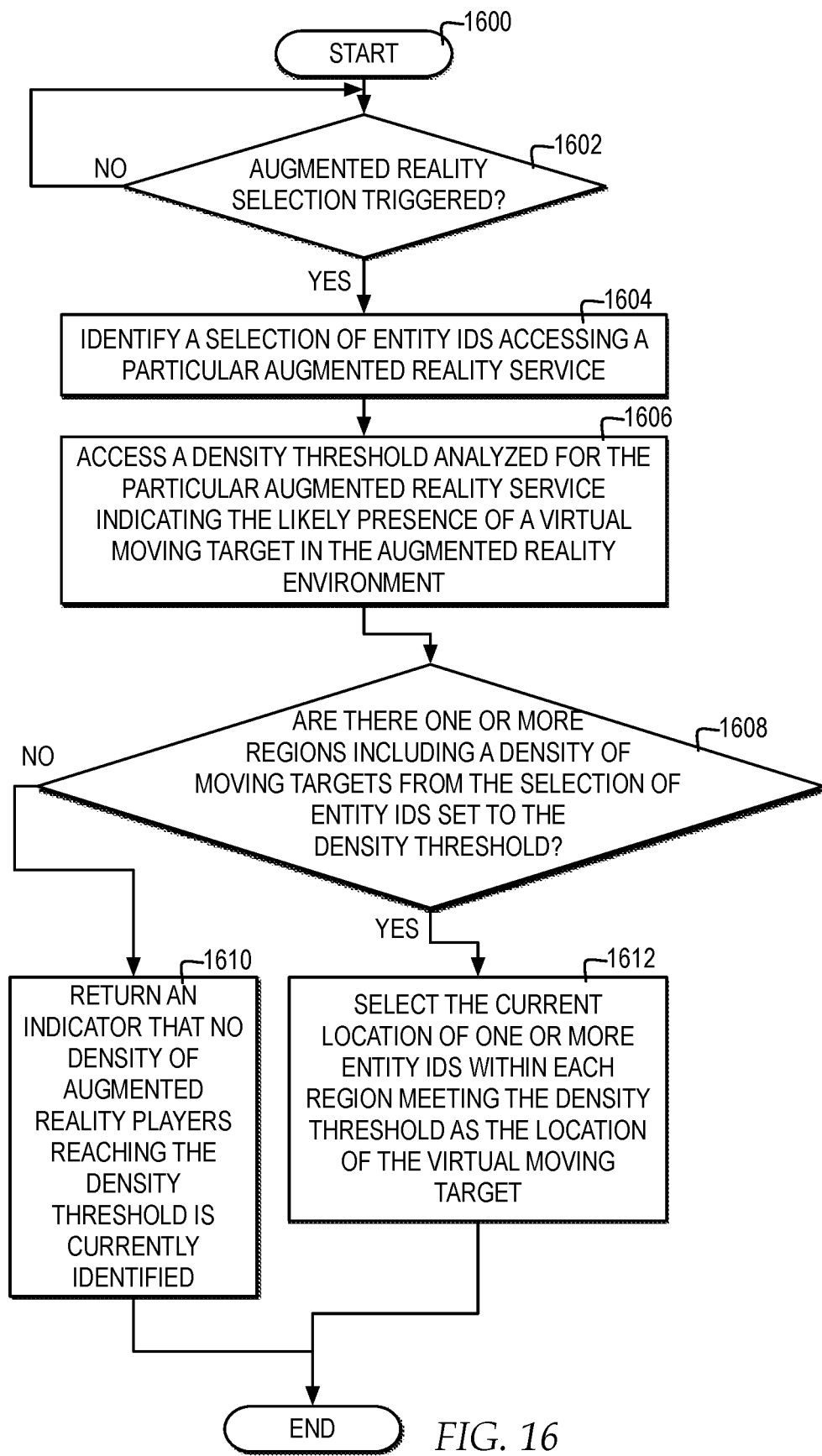
FIG. 16 illustrates a high-level logic flowchart of a process and computer program for directing navigation of at least one user accessing an augmented reality service requesting to intersect with a density of other moving targets accessing the augmented reality service to potentially access a virtual moving target.

FIG. 16 illustrates a high-level logic flowchart of a process and computer program for directing navigation of at least one user accessing an augmented reality service requesting to intersect with a density of other moving targets accessing the augmented reality service to potentially access a virtual moving target.

In one example, the process and computer program starts at block 1600 and thereafter proceeds to block 1602. Block 1602 illustrates a determination whether the augmented reality selection is triggered. If the augmented reality selection is triggered, then the process passes to block 1604. Block 1604 illustrates identifying a selection of entity IDs accessing a particular augmented reality service. Next, block 1606 illustrates accessing a density threshold of users accessing the particular augmented reality service indicating the likely presence of a virtual moving target in the augmented reality environment. Thereafter, block 1608 illustrates a determination whether there are one or more regions including a density of moving targets from the selection of entity IDs set to the density threshold.

At block 1608, if there are not one or more regions including a density of moving targets from the selection of entity IDs set to the density threshold, then the process passes to block 1610. Block 1610 illustrates returning an indicator that no density of augmented reality players reaching the density threshold is currently identified, and the process ends.

At block 1608, if there are one or more regions including a density of moving targets from the selection of entity IDs set to the density threshold, then the process passes to block 1612. Block 1612 illustrates selecting at least one current location of one or more entity IDs within each region meeting the density threshold as the location of the virtual moving target, and the process ends.

Figure 17:
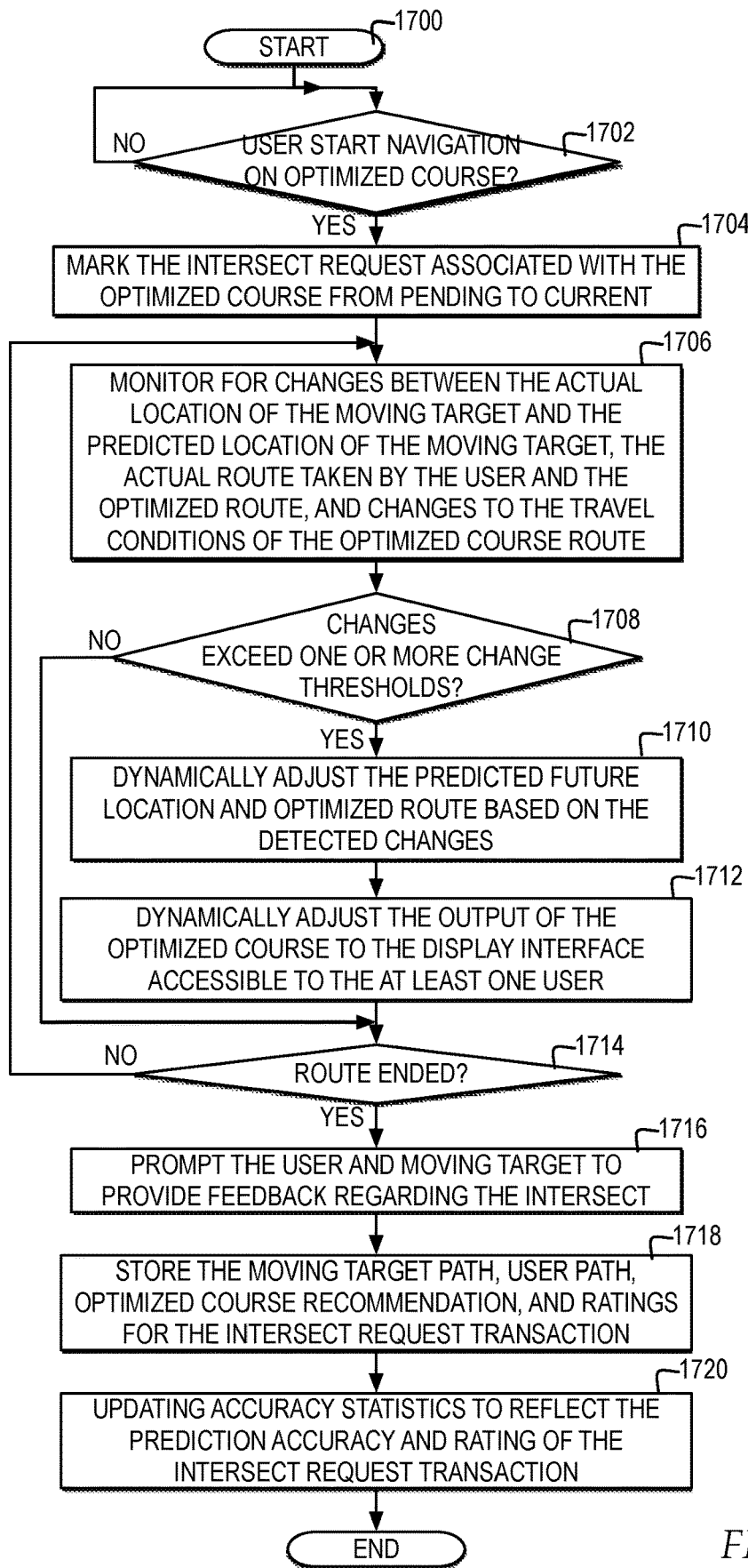
FIG. 17 illustrates a high-level logic flowchart of a process and computer program for dynamically adjusting the optimized route for a user to intersect with a moving target.

FIG. 17 illustrates a high-level logic flowchart of a process and computer program for dynamically adjusting the optimized route for a user to intersect with a moving target. In one example, the process and computer program start at block 1700 and thereafter proceeds to block 1702. Block 1702 illustrates a determination whether the user has started navigation on an optimized course. At block 1702, once a user starts navigation on an optimized course, the process marks the intersect request associated with the optimized course from pending to current. Next, block 1704 illustrates monitoring for changes between the actual location of the moving target and the predicted location of the moving target, the actual route taken by the user and the optimized route, and changes to the travel conditions of the optimized course route. Thereafter, block 1708 illustrates a determination whether the changes exceed one or more change thresholds.

At block 1708, if the changes do not exceed one or more change thresholds, then the process passes to block 1714. Block 1714 illustrates a determination whether a route has ended, whether by the user selecting to end navigation for the intersect request or the user reaching the intersect location. At block 1714, if the route has not ended, then the process returned to block 1708. At block 1714, if the route has ended, then the process passes to block 1716. Block 1716 illustrates prompting the user and moving target to provide feedback regarding the intersect. Next, block 1718 illustrates storing the moving target path, user path, optimized course recommendations, ratings, and other information gathered from the intersect request transaction. Thereafter, block 1720 illustrates updating the accuracy statistics to reflect the prediction accuracy and rating of the intersect request transaction, and the process ends.

Returning to block 1708, at block 1708, if the changes exceed one or more change thresholds, then the process passes to block 1710. Block 1710 illustrates dynamically adjusting the predicted future location and optimized route based on the detected changes. Next, block 1712 illustrates dynamically adjusting the output of the optimized course to the display interface accessible to the at least one user, and the process passes to block 1714, and proceeds as previously described.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method, comprising:
 a computer system receiving a selection by at least one user of at least one user path device to intersect with a moving target, wherein the moving target is identified by a particular entity identifier that is not a fixed address;
 the computer system detecting broadcasts of one or more monitored locations within a network environment, each identified by a separate entity identifier of a plurality of entity identifiers;
 the computer system reading a plurality of locations from broadcasts of the one or more monitored locations by a navigation device, the navigation device carried by the moving target identified by the particular entity identifier and using a location detecting system to determine and track a current location, a current time, and a direction of movement of the navigation device, the navigation device broadcasting the current location, the current time, and the direction of movement;
 the computer system accessing a path of the plurality of locations of the moving target monitored by the navigation device;
 the computer system predicting, based on the path of the plurality of locations and based on at least one context record, one or more future locations of the moving target;
 the computer system calculating at least one optimized course for the at least one user to follow to intersect with the moving target at the one or more future locations; and
 the computer system outputting the at least one optimized course to a display interface of the at least one user path device accessible to the at least one user for directing the user to navigate from a starting point to at least one of the one or more future locations.

2. The method according to claim 1, further comprising:
 the computer system selecting a particular future location of the one or more future locations of the moving target to minimize a total delay and to minimize energy expended by each of a first user of the at least one user starting from a first location and by a second user of the at least one user starting from a second location.

3. The method according to claim 1, further comprising:
 the computer system calculating the at least one optimized course for the at least one user to follow to intersect with the moving target at the one or more future locations only if the at least one user is authorized by an authorized user of the navigation device to access the path of the plurality of locations of the moving target;

the computer system monitoring, as the at least one user navigates from the starting point to the at least one of the one or more future locations, whether the path of the plurality of locations of the moving target align with the one or more future locations;

the computer system, responsive to the path of the plurality of locations deviating from the one or more future locations, adjusting the prediction of the future locations of the moving target to one or more updated future locations; and the computer system updating the output of the optimized course in the display interface with an indicator of a change to direct the at least one user to navigate to one of the one or more updated future locations.

4. The method according to claim 1, further comprising:
the computer system accessing a plurality of paths each of a plurality of locations of a plurality of moving targets each monitored by a separate navigation device;

the computer system, responsive to the at least one user requesting to intersect with each of the plurality of moving targets at a plurality of separate intersection points within a particular time window, calculating the at least one optimized course for the at least one user to follow to intersect with each of the plurality of moving targets at the plurality of separate intersection points on the at least one optimized course to minimize a total travel path of the at least one user.

5. The method according to claim 1, wherein the computer system predicting, based on the path of the plurality of locations and based on at least one context record, one or more future locations of the moving target the computer system calculating at least one optimized course for at least one user to follow to intersect with the moving target at one or more future locations predicted based on the path of the plurality of locations and based on at least one context record further comprises:
the computer system accessing the at least one context record comprising at least one scheduled event comprising a meeting location, a meeting time, and a meeting duration from an electronic calendar associated with the moving target.

6. The method according to claim 5, further comprising:
the computer system, responsive to detecting that the path of the plurality of locations of a moving target for a current time period is moving away from a particular scheduled event of the at least one scheduled event for the current time period, predicting the one or more future locations of the moving target based a direction and pace of the path of the plurality of locations and at least one additional context record indicating a current travel condition of one or more areas accessible to the moving target during the current time period.

7. The method according to claim 1, wherein the computer system predicting, based on the path of the plurality of locations and based on at least one context record, one or more future locations of the moving target further comprises:
the computer system accessing the at least one context record comprising a plurality of previously traversed locations of the moving target each recorded with a separate traversal time;

the computer system analyzing a selection of the previously traversed locations with a particular traversal time within a time window selected by the at least one user for intersecting with the moving target; and the computer system predicting the one or more future locations from the analysis of the selection of previously traversed locations.

8. The method according to claim 1, wherein the computer system calculating at least one optimized course for the at least one user to follow to intersect with the moving target at the one or more future locations further comprises:
the computer system predicting a first type of transportation used by the moving target based on a speed of travel and route of the moving target detected from the path of the plurality of locations;

the computer system selecting at least one second type of transportation available to the at least one user for optimizing travel to intersect with the moving target; and the computer system calculating the at least one optimized course for the moving target traveling by the first type of transportation and the at least one user traveling by the at least one second type of transportation.

9. The method according to claim 8, further comprising:
the computer system outputting the at least one optimized course to the display interface comprising a notification of the at least one second type of transportation selected.

10. The method according to claim 1, wherein the computer system outputting the at least one optimized course to a display interface of the at least one user path device accessible to the at least one user further comprises:
the computer system outputting the at least one optimized course and the path of the plurality of locations of the moving target to the display interface;

the computer system dynamically updating the output of the at least one optimized course to indicate a current position of the at least one user as the at least one user moves; and the computer system dynamically updating the output of the path of the plurality of location of the moving target to indicate an updated position of the moving target as the moving target moves.

11. The method according to claim 1, further comprising:
the computer system detecting a service indicator of a service provided by the moving target and an availability of the service provided by the moving target within a particular time window; and the computer system, responsive to detecting the at least one user request comprising a particular service matching the service indicator with the particular time window, requesting to access the path of the plurality of locations of the moving target monitored by the navigation device.

12. The method according to claim 1, wherein the computer system accessing a path of the plurality of locations of the moving target monitored by the navigation device, further comprises:
the computer system accessing the path of the plurality of locations of the moving target comprising the plurality of locations within a selected radius, wherein the moving target only authorizes the navigation device to broadcast the plurality of locations for a particular time period within the selected radius.

13. The method according to claim 1, further comprising:
the computer system accessing a plurality of paths each of a plurality of locations of a plurality of moving targets each monitored by a separate navigation device; and the computer system selecting a particular moving target from among the plurality of moving targets to calculate the at least one optimized course for the at least one user to follow to intersect with the particular moving target based on the particular moving target matching a criteria selected by the at least one user.

14. The method according to claim 1, further comprising:
the computer system accessing a plurality of paths each of a plurality of locations of a plurality of moving targets each monitored by a separate navigation device;
the computer system identifying a particular area comprising a selection of the plurality of moving targets of a density reaching a density threshold and the plurality of moving targets comprising an attribute matching a selected attribute; and
the computer system setting a particular future location for the one or more future locations of the optimized course to the particular area.

15. The method according to claim 1, wherein the computer system calculating at least one optimized course for the at least one user to follow to intersect with the moving target at the one or more future locations further comprises:
the computer system detecting at least one selected location from among the one or more future locations with a location attribute indicating a lack of accessibility of the at least one selected location to the at least one user; and
the computer system removing the at least one selected location from the one or more future locations for selection in calculating the at least one optimized course.

16. The method according to claim 15, further comprising:
the computer system receiving the location attribute indicating a lack of accessibility from one or more of the at least one user, the moving target, and an authorized user designating the at least one selected location with the location attribute.

17. The method according to claim 1, wherein the computer system calculating at least one optimized course for the at least one user to follow to intersect with the moving target at the one or more future locations further comprises:
the computer system accessing at least one location attribute of the one or more future locations indicating a directional attribute of the location; and
the computer system calculating the at least one optimized course for the at least one user to following to intersect with the moving target from a particular direction based on the directional attribute of the location.

18. The method according to claim 1, further comprising:
the computer system receiving a selection of a particular time to intersect with the moving target from the user;
the computer system calculating the at least one optimized course with separate start time for the at least one user to follow to intersect with the moving target at the one or more future locations at the particular time predicted based on the path of the plurality of locations and based on the at least one context record; and
the computer system outputting the at least one optimized course with separate start time to the display interface accessible to the at least one user.

19. The method according to claim 18, wherein the computer system calculating the at least one optimized course with separate start time for the at least one user to follow to intersect with the moving target at the one or more future locations at the particular time predicted based on the path of the plurality of locations and based on the at least one context record further comprises:

the computer system calculating a first optimized course from among the at least one optimized course for the at least one user to follow from a first start time traveling by a first type of transportation; and
the computer system calculating a second optimized course from among the at least one optimized course for the at least one user to follow from a second start time traveling by a second type of transportation.

20. The method according to claim 1, wherein the computer system calculating at least one optimized course for the at least one user to follow to intersect with the moving target at the one or more future locations further comprises:
the computer system calculating the at least one optimized course for the at least one user to follow to intersect with the moving target at the one or more future locations predicted based on the path of the plurality of locations, based on the at least one context record, and based on a cognitive state of the at least one user predicted from one or more eye movements of the at least one user detected over a period of time.

21. The method according to claim 1, further comprising:
the computer system receiving one or more user inputs through one or more input interfaces of a time window for the intersect, a maximum time to travel to the intersect from a current location, a budget for transportation, a maximum time to wait at a particular location to the intersect, and a priority level for the intersect;
the computer system determining whether there is at least one optimized course for the at least one user to follow to intersect with the moving target at one or more future locations predicted on the path of the plurality of the locations and based on the at least one context record within the time window, constrained by the maximum time to travel and the maximum time to wait, with the transportation selected according to the budget;
the computer system, responsive to determining there is not at least one optimized course, determining whether the priority level for the intersect requires adjusting one or more parameters to identify the at least one optimized course; and
the computer system, responsive to determining the priority level for the intersect does not require adjusting the one or more parameters to identify the at least one optimized course, triggering an electronic calendar service to select to schedule an event for the at least one user and the moving target.

22. The method according to claim 1, further comprising:
the computer system monitoring whether the at least one user intersects with the moving target at a particular location among the one or more future locations;
the computer system, responsive to detecting the at least one user intersect with the moving target at the particular location, prompting the at least one user to rate the intersect;
the computer system, responsive to receiving a rating input from the at least one user for the intersect, recording an additional context record for the particular location with the at least one optimized course taken to reach the particular location and with the rating input;
the computer system updating a selection of the at least one context record for the particular location with the additional context record.

* * * * *